United States Patent
Hughes

(10) Patent No.: US 7,058,896 B2
(45) Date of Patent: Jun. 6, 2006

(54) SYSTEM, METHOD AND COMPUTER PROGRAM PRODUCT FOR INTUITIVE INTERACTIVE NAVIGATION CONTROL IN VIRTUAL ENVIRONMENTS

(75) Inventor: David W Hughes, Henley on Thames (GB)

(73) Assignee: Silicon Graphics, Inc., Mountain View, CA (US)

( * ) Notice: Subject to any disclaimer, the term of this patent is extended or adjusted under 35 U.S.C. 154(b) by 655 days.

(21) Appl. No.: 10/046,179

(22) Filed: Jan. 16, 2002

(65) Prior Publication Data

US 2003/0132973 A1 Jul. 17, 2003

(51) Int. Cl.
*G06F 3/00* (2006.01)
*G06F 9/00* (2006.01)
*G06F 17/00* (2006.01)

(52) U.S. Cl. ............ 715/757; 715/718; 715/850; 345/419; 345/473

(58) Field of Classification Search ............ 434/300; 715/718, 850, 851; 345/418–427, 473, 474
See application file for complete search history.

(56) References Cited

U.S. PATENT DOCUMENTS

| 5,604,848 | A | * | 2/1997 | Harada et al. | 345/419 |
| 6,222,554 | B1 | * | 4/2001 | Berry et al. | 345/427 |
| 6,323,859 | B1 | * | 11/2001 | Gantt | 345/419 |
| 6,346,938 | B1 | * | 2/2002 | Chan et al. | 345/419 |
| 6,597,380 | B1 | * | 7/2003 | Wang et al. | 715/782 |

OTHER PUBLICATIONS

Chen, Jim, Physics Based Modeling and Real-Time Simulation, May/Jun. 2001, pp. 98-102.*
Interactive Physics, Creating Simulations using Interactive Physics 2000, pp. 14.*
Woodard et al. "Developing a Framework for IG-Independent PC-Based Dynamic Terrain", STRICOM, 2001, pp. 1-10.*

* cited by examiner

*Primary Examiner*—Steve Sax
*Assistant Examiner*—Ryan F. Pitaro
(74) *Attorney, Agent, or Firm*—Sterne, Kessler, Goldstein & Fox PLLC

(57) ABSTRACT

A system, method and computer program product is provided for interactive user navigation in a real-time 3D simulation. An assembly builder permits a user to build customized physics-based assemblies for user navigation in a variety of virtual environments. These assemblies are stored in a library and are then accessed by a navigation run-time module that runs in conjunction with, or as a part of, a visual run-time application. The navigation run-time module receives high-level user goal requests via a simple and intuitive user interface, converts them into a series of tasks, and then selects the appropriate assembly or assemblies to perform each task. As a result, complex navigation may be achieved. Once selected, an assembly provides a physics-based eye-point model for user navigation. Collisions between the assembly and objects in the simulation are resolved using a real-time physics engine, thus ensuring smooth, cinematic-style eye-point modeling in addition to real-time control.

24 Claims, 16 Drawing Sheets

RELEVANT ART

FIG.9B LINEAR SPACER 904
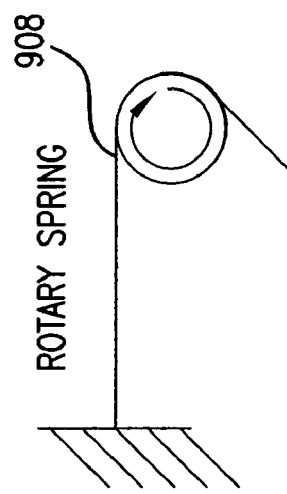
FIG.9D ROTARY SPRING 908
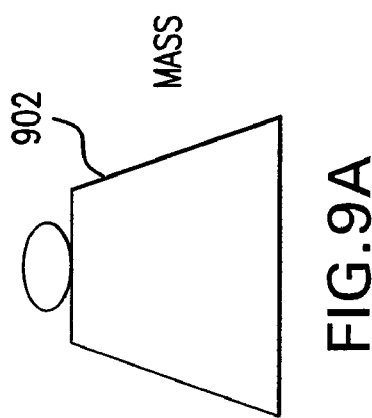
FIG.9A MASS 902
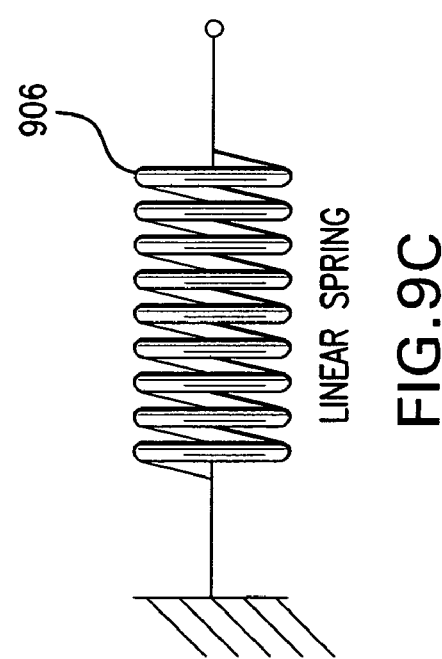
FIG.9C LINEAR SPRING 906

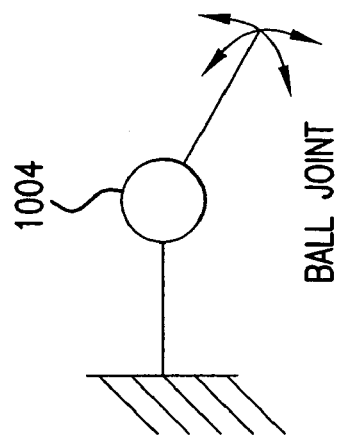
FIG.10B BALL JOINT
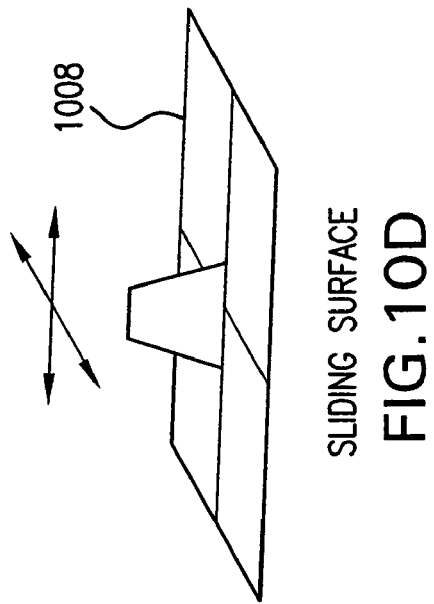
FIG.10D SLIDING SURFACE
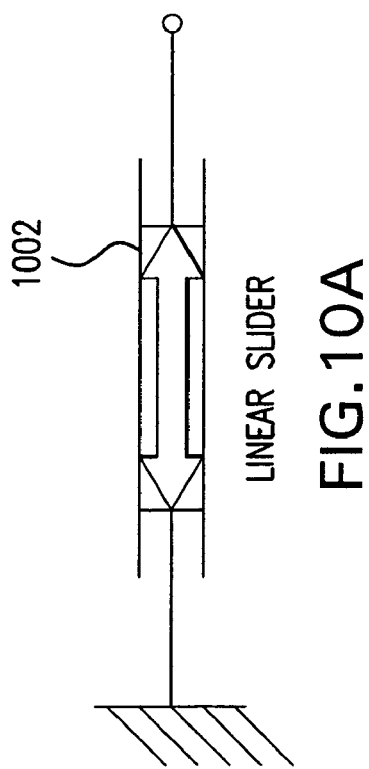
FIG.10A LINEAR SLIDER
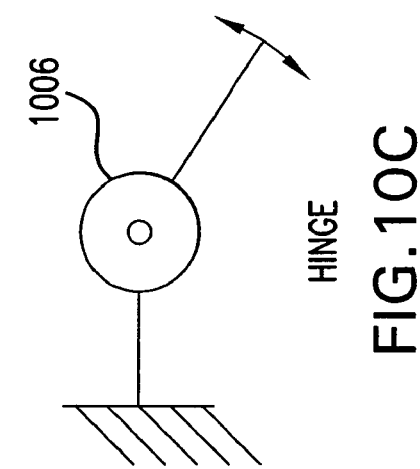
FIG.10C HINGE

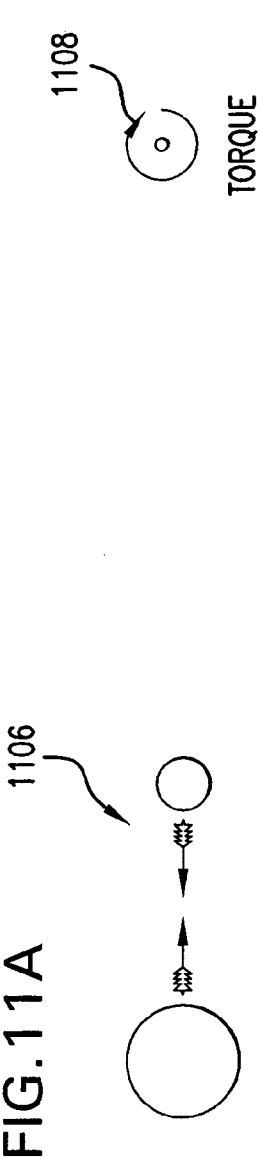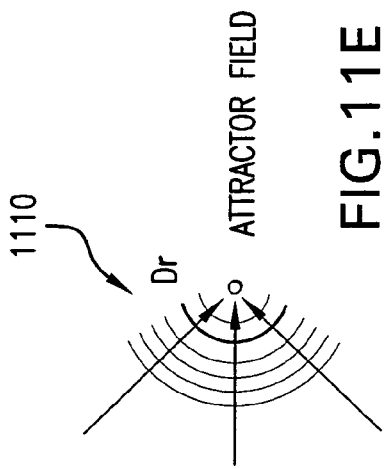
FIG. 11A — GRAVITY (DOWN) — 1102
FIG. 11B — ARBITARY FORCE — 1104
FIG. 11C — MASS ATTRACTION — 1106
FIG. 11D — TORQUE — 1108
FIG. 11E — ATTRACTOR FIELD — 1110, Dr

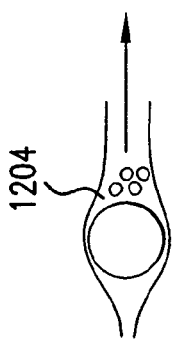
FLUID DRAG
FIG.12B
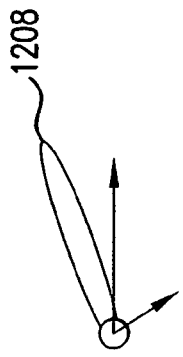
CONTROL SURFACE
FIG.12D
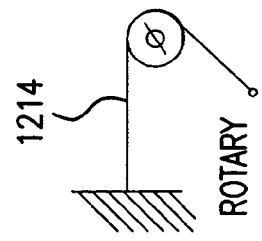
ROTARY
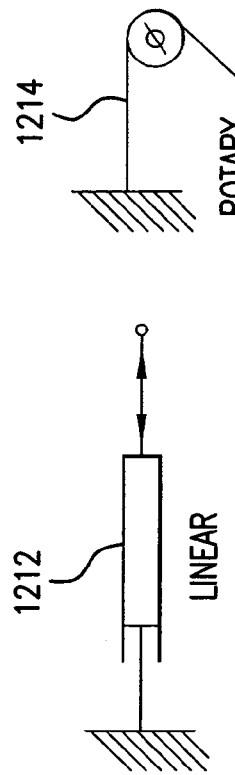
LINEAR
DAMPERS
FIG.12F
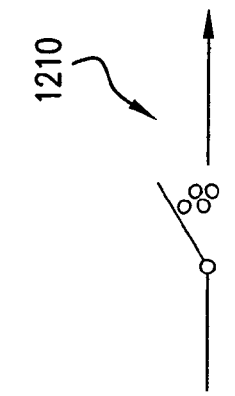
SURFACE DRAG
FIG.12A
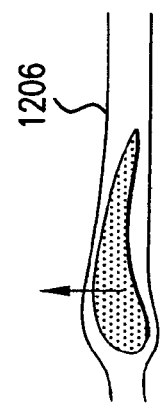
LIFT ON FORWARD MOTION
FIG.12C
AIR BRAKE
FIG.12E

○ = MASS
⇕ = SPRING
▯ = DAMPER
⊗ = ROLLER

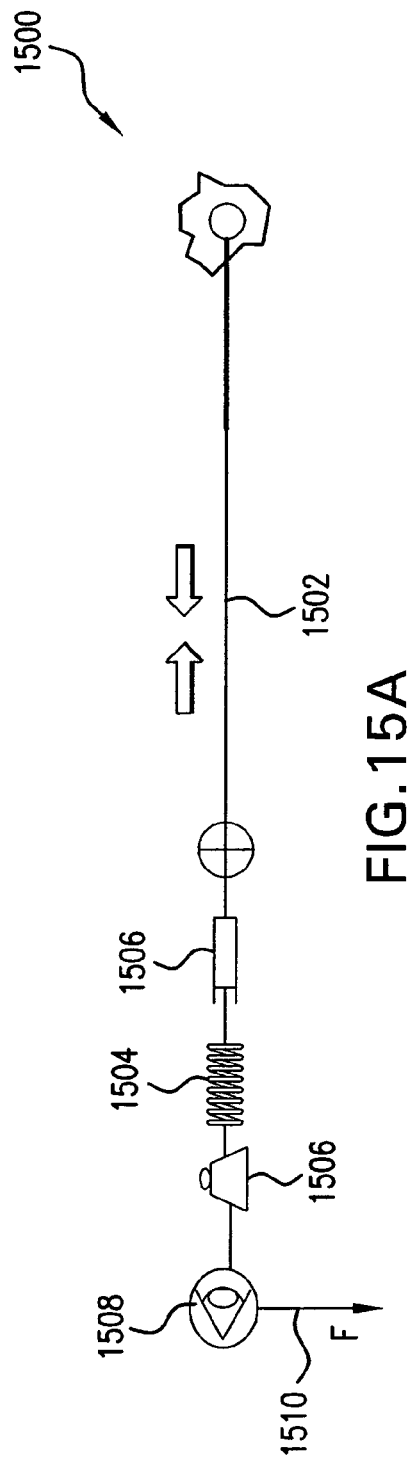
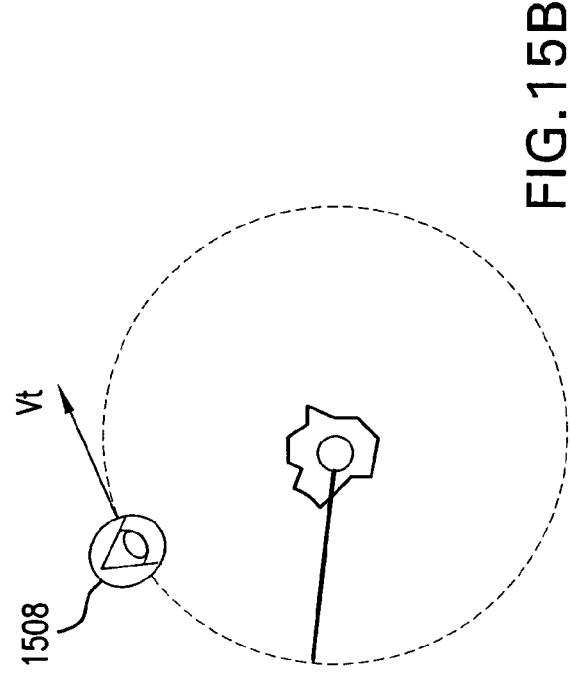
FIG. 15A
FIG. 15B

SYSTEM, METHOD AND COMPUTER PROGRAM PRODUCT FOR INTUITIVE INTERACTIVE NAVIGATION CONTROL IN VIRTUAL ENVIRONMENTS

BACKGROUND OF THE INVENTION

1. Field of the Invention

The present invention is generally related to computer-simulated three-dimensional (3D) environments. More specifically, the present invention is related to user interfaces and controls for computer-simulated 3D environments.

2. Background

Great advances have been made in the technology of computer-simulated 3D environments. In particular, great advances have been made in the building and simulation of real-time user-interactive virtual reality ("VR") environments. These advances include achievements in the areas of VR database construction, visual and audio realism, stereoscopy, real-time performance, complex data handling, display environments and group VR. As a result of these advances, it has become possible to build and simulate real-time VR environments with extremely high levels of realism for both individual and group interaction.

However, vast improvements are still needed in the area of user navigation in virtual environments. As used herein, the term "user navigation" includes both the control interface by which a user interacts with a virtual environment as well as the eye-point model (also referred to as the "gaze-point model" or "camera") that dictates the user's view of the simulation.

Generally speaking, conventional VR control interfaces are either too crude or overly-complex. Where the interface is too crude, the ability of a user to interact with a virtual environment is severely limited, thus detracting from the overall effectiveness of the simulation. Where the interface is too complex, extensive training or the assistance of a specialist may be required in order to successfully move through and/or interact in the simulation. Unless an improved navigation control interface is developed that is intuitive and easy to use, the transition of VR from the lab to industry will be hindered. The development of such a control interface would not only be welcomed by businesses that traditionally use VR, but will also be a critical factor in bridging VR applications to new markets and wider audiences.

Conventional navigation tools also typically fail to provide natural, cinematic-style eye-point modeling, or can only provide such modeling at the expense of real-time interactivity. No matter how realistic a simulation may be, a poor eye-point model can destroy the sense of immersion that the simulation is designed to create. In extreme cases, an unnatural eye-point model can cause disorientation or nausea on the part of the audience.

Conventional user navigation solutions may be grouped into the following three categories: (i) navigation tools that are provided with conventional 3D rendering toolkits; (ii) navigation models built on keyframe technology; and (iii) highly-specialized custom and proprietary VR navigation interfaces developed for the simulator industry. As will be discussed below, none of these solutions provides the combination of an intuitive, easy-to-use control interface for real-time interaction, natural, cinematic eye-point modeling, and general applicability to a variety of virtual environments.

The navigation tools that are provided with conventional 3D rendering toolkits are typically primitive and inflexible. This is largely due to the fact that designers of these toolkits have focused on features related to simulation building and performance, rather than on navigation. These navigation tools can be frustrating to use because they provide only a minimal level of control and very limited options for exploring a virtual environment. Additionally, these navigation tools often use crude eye-point motion models that can cause jarring visual effects that are unpleasant for the user. In extreme cases, these visual effects can cause disorientation and nausea on the part of the user.

Keyframe technology is the traditional approach for providing smooth, cinematic navigation through simulated 3D environments. The use of keyframes involves creating a spline path through a 3D scene. The eye-point is then replayed along the path to create a smooth and natural-feeling motion. A disadvantage of this technique is that it requires considerable editing of paths prior to operation. Additionally, the use of this technique typically prohibits real-time user control, limiting the user to linear movement along a predefined path with a predefined point of view. Where real-time control is required, it must be pre-planned. Consequently, this technique does not take into account unplanned requests or the ability to branch at will. In effect, the use of keyframes provides an experience more akin to viewing a fixed animation than to actual interactive navigation.

The highly-specialized custom and proprietary VR navigation interfaces developed for the simulator industry are typically only effective for the specific application for which they were designed. For example, these navigation interfaces typically simulate only a specific type of vehicle for interacting with a single type of virtual environment. Furthermore, these navigation interfaces are usually a hard-coded part of the simulator itself, prohibiting user modification or adaptation for application to other virtual environments. As a result, these interfaces have no general applicability.

What is needed, then, is a general-purpose navigation tool that provides intuitive, easily controlled navigation in a variety of complex virtual environments. The desired navigation tool should enable an end user to rapidly construct realistic navigation models for natural interaction with a variety of complex virtual environments. The desired navigation tool should also provide an intuitive control mechanism that requires minimal training to use. The desired navigation tool should further enable complex, cinema style, eye-point control in real-time. Finally, the desired navigation tool should also be flexible, adaptive and easy to modify and enhance.

BRIEF SUMMARY OF THE INVENTION

The present invention provides a system, method and computer program product for providing interactive user navigation in a real-time three dimensional (3D) simulation. Embodiments of the present invention are implemented in a modeling environment and a run-time environment. The modeling environment includes an assembly builder that permits a user to build customized physics-based assemblies for user navigation in a variety of virtual environments. These assemblies are then stored in a library and are accessed by a navigation run-time module that runs in conjunction with, or as a part of, a visual run-time application. The navigation run-time module receives high-level user goal requests via a simple and intuitive user interface and converts them into a series of tasks. The navigation run-time module then selects the appropriate assembly or assemblies to perform each task. As a result, complex navigation may be achieved. Once selected, an assembly provides a physics-based eye-point model for user navigation. Collisions between the assembly and objects in the simulation are resolved using a real-time physics engine, thus ensuring smooth, cinematic-style eye-point modeling in addition to real-time control.

A system in accordance with an embodiment of the present invention includes an assembly builder, a library, and a visual run-time application. The assembly builder includes a first interface that permits a user to combine physical elements from a predefined set of physical elements to construct a plurality of behavioral assemblies. The library stores the plurality of behavioral assemblies. The first interface may comprise a graphical user interface that includes a first window and a second window. The first window presents the predefined set of physical elements to the user, and the second window permits the user to selectively combine physical elements from the first window to construct the plurality of behavioral assemblies. The graphical user interface may also include a third window that permits the user to adjust a parameter of at least one of the selectively combined physical elements, and a fourth window that permits the user to simulate the performance of the plurality of behavioral assemblies.

The visual-run time application executes the real-time three dimensional simulation and includes a second interface and a navigation run-time module. The second interface receives a goal request from the user. The navigation run-time module includes a goal interface, a task interactor, and a real-time physics engine. The goal interface is configured to receive the goal request from the second interface and to translate the goal request into a plurality of tasks. The task interactor is configured to receive the plurality of tasks from the goal interface and to select one of the plurality of behavioral assemblies from the library to perform one of the plurality of tasks. The selected behavioral assembly provides a physics-based eye-point model for user navigation during execution of the task. When the navigation run-time module detects a collision between the selected one of the plurality of behavioral assemblies and an object in the real-time three dimensional simulation, it invokes the real-time physics engine to model the interaction between the behavioral assembly and the object.

A benefit of the present invention is that it permits a user to rapidly build customized physics-based assemblies for user navigation in a variety of virtual environments.

A further benefit of the present invention is that it provides a simple and intuitive control mechanism for performing complex navigation in virtual environments.

A still further benefit of the present invention is that it provides for smooth, cinematic-style eye-point modeling in addition to real-time navigation control.

Additional features and advantages of the invention will be set forth in the description that follows, and in part will be apparent from the description, or may be learned by practice of the invention. The objectives and other advantages of the invention will be realized and attained by the system and method particularly pointed out in the written description and claims hereof as well as the appended drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 9A–9D illustrate examples of passive physical elements that may be incorporated into a behavioral assembly in accordance with embodiments of the present invention.

FIGS. 10A–10D illustrate motion constraint physical elements that may be incorporated into a behavioral assembly in accordance with embodiments of the present invention.

FIGS. 11A–11E illustrate active physical elements that may be incorporated into a behavioral assembly in accordance with embodiments of the present invention.

FIGS. 12A–12F illustrate resistive physical elements that may be incorporated into a behavioral assembly in accordance with embodiments of the present invention.

FIGS. 13A, 13B, 14A, 14B, 15A and 15B depict example behavioral assemblies that may be constructed and utilized for user navigation in accordance with embodiments of the present invention.

Figure 1:
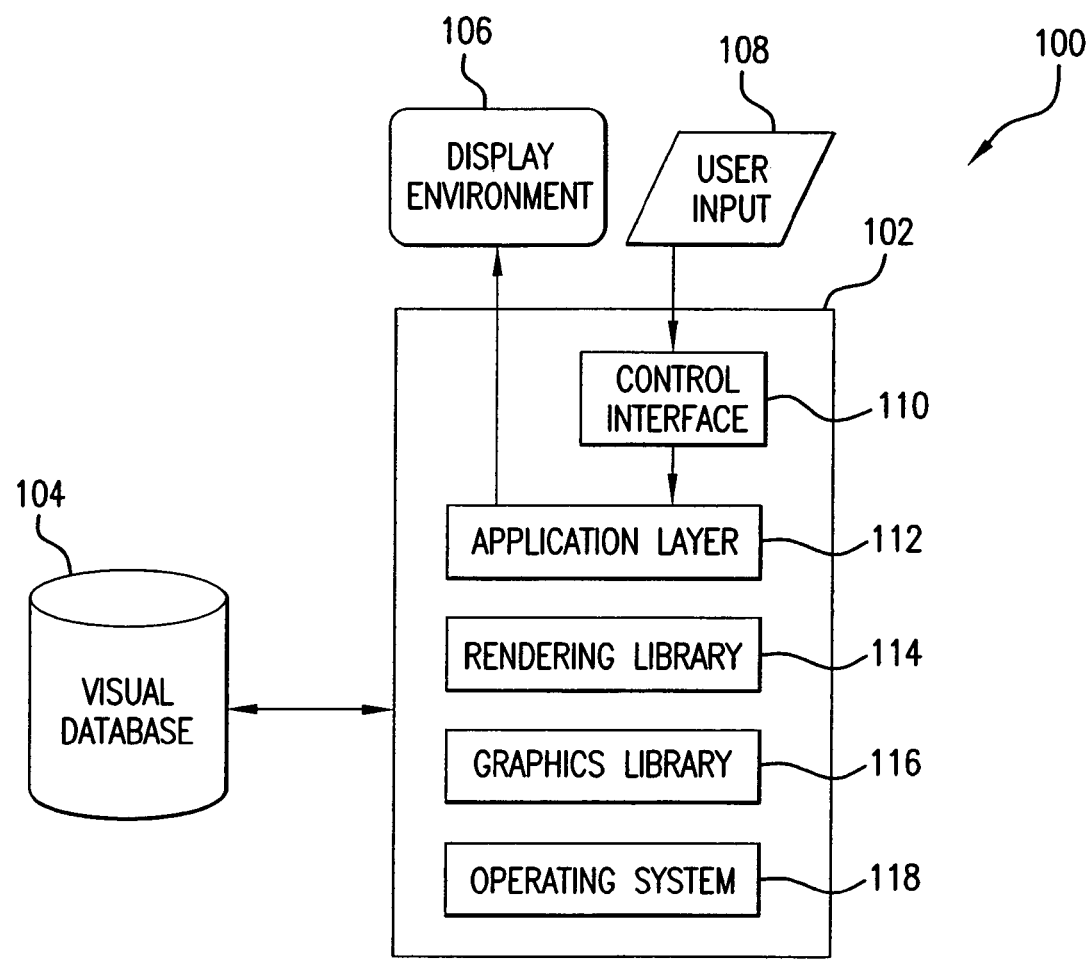
FIG. 1 is a functional block diagram of a conventional user-interactive real-time 3D simulation application.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

A. Conventional User-Interactive Real-Time 3D Simulator
B. User-Interactive Real-Time 3D Simulator in Accordance with Embodiments of the Present Invention
   1. Modeling Environment in Accordance with Embodiments of the Present Invention
   2. Visual Run-Time Environment in Accordance with Embodiments of the Present Invention C. Example Physical Elements and Behavioral Assemblies in Accordance with Embodiments of the Present Invention
   1. Example Physical Elements
   2. Example Behavioral Assemblies
      a. Navigation through Confined Spaces
      b. Observing Points of Interest
      c. Attaching to an Object/Orbit Insertion
D. Alternate Modeling and Run-Time Environments in Accordance with Embodiments of the Present Invention
E. Conclusion A. Conventional User-Interactive Real-Time 3D Simulator FIG. 1 depicts a high-level functional block diagram of a conventional user-interactive real-time 3D simulator 100, which is described herein to provide a better understanding of the present invention. As shown in FIG. 1, the 3D simulator 100 comprises a visual database 104 and a visual run-time application 102. The visual database 104 stores the properties of all the objects and animations that make up the virtual world, a small portion of which may be visible to the user at any particular point in time. The visual run-time application 102 acquires object and animation information from the visual database 104 and uses this information to construct a display environment 106 for a user during run-time. Typically, the visual database 104 is built off-line, prior to execution of the visual run-time application 102, using conventional 3D world modeling utilities.

The visual run-time application 102 usually comprises multiple software layers. At the lowest level is the operating system 118 of the computer on which the application 102 is running. Above the operating system 118 is a graphics library 116 and a rendering library 114. The graphics library 116 and the rendering library 114 provide the ability to select, process and render a visual scene in real time. The graphics library 116 is used to perform core graphics functions for generating images in the display environment 106, while the rendering library 114 is used to implement higher level functions specifically tailored for rapidly generating efficient and functionally-rich simulations.

Above the graphics library 116 and the rendering library 114 is an application layer 112 that performs the highest-level functions of the simulator 100 such as receiving and processing user inputs, orchestrating calls to the rendering library 114 and/or graphics library 116, determining the current visual scenario at any particular time with reference to the visual database 104, such as determining the position and state of objects and the environment, and presenting that scenario to the user via the display environment 106. The application layer 112 typically receives user input 108 via a control interface 110, which is responsible for permitting the user to interact with the real-time virtual environment. These interactions may include, for example, moving through the virtual environment, selecting and modifying objects, making changes in a scene, modifying modes of visualization, and the like.

As discussed in the Background section above, in the conventional 3D simulation application 102 the control interface 110 is typically very primitive, providing only a minimal level of user control and very few options for user interaction. Alternatively, the control interface 110 may comprise a highly specialized application-specific interface, such as those used in the simulator industry or in computer games. This latter type of interface is usually designed to work with only a single application 102 and is hard-coded into that application, thus prohibiting user modification or adaptation to other virtual environments.

In the conventional 3D simulator 100, the application layer 112 performs eye-point modeling based on information received from the control interface 110. Eye-point modeling determines the appropriate presentation of the display environment 106 based on the current position and orientation of the user of the simulator 100 and other objects in the scene. As discussed in the Background section above, in conventional 3D simulation applications, the eye-point-modeling routines utilized by the application layer 112 are either very crude, resulting in very unnatural or stilted eye-point models, rely on keyframe technology, which provides a smooth transition at the expense of user real-time control, or highly specific, and thus inflexible.

B. User-Interactive Real-Time 3D Simulator in Accordance with Embodiments of the Present Invention Embodiments of the present invention address the deficiencies of conventional 3D simulators described above by providing an intuitive, easy-to-use navigation interface that enables both interactive real-time control and natural, elegant eye-point modeling. Additionally, embodiments of the present invention may be flexibly modified and adapted to a variety of virtual environments.

Figure 2:
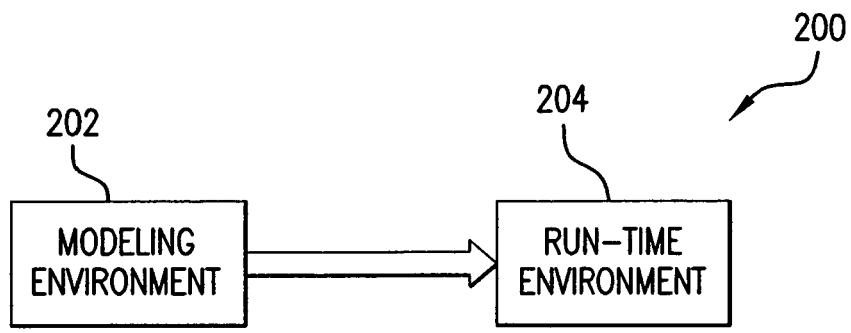
FIG. 2 is a block diagram depicting a modeling environment and a run-time environment in accordance with embodiments of the present invention.

FIG. 2 depicts a high-level block diagram of a 3D simulation environment 200 in accordance with embodiments of the present invention. As shown in FIG. 2, the 3D simulation environment 200 includes both a modeling environment 202 and a run-time environment 204. As will be discussed in more detail herein, the modeling environment 202 is used, in part, to define customized physics-based behavioral assemblies prior to execution of the run-time environment 204. These behavioral assemblies are then selectively accessed for user interaction and eye-point modeling in the run-time environment 204.

1. Modeling Environment in Accordance with Embodiments of the Present Invention

Figure 3:
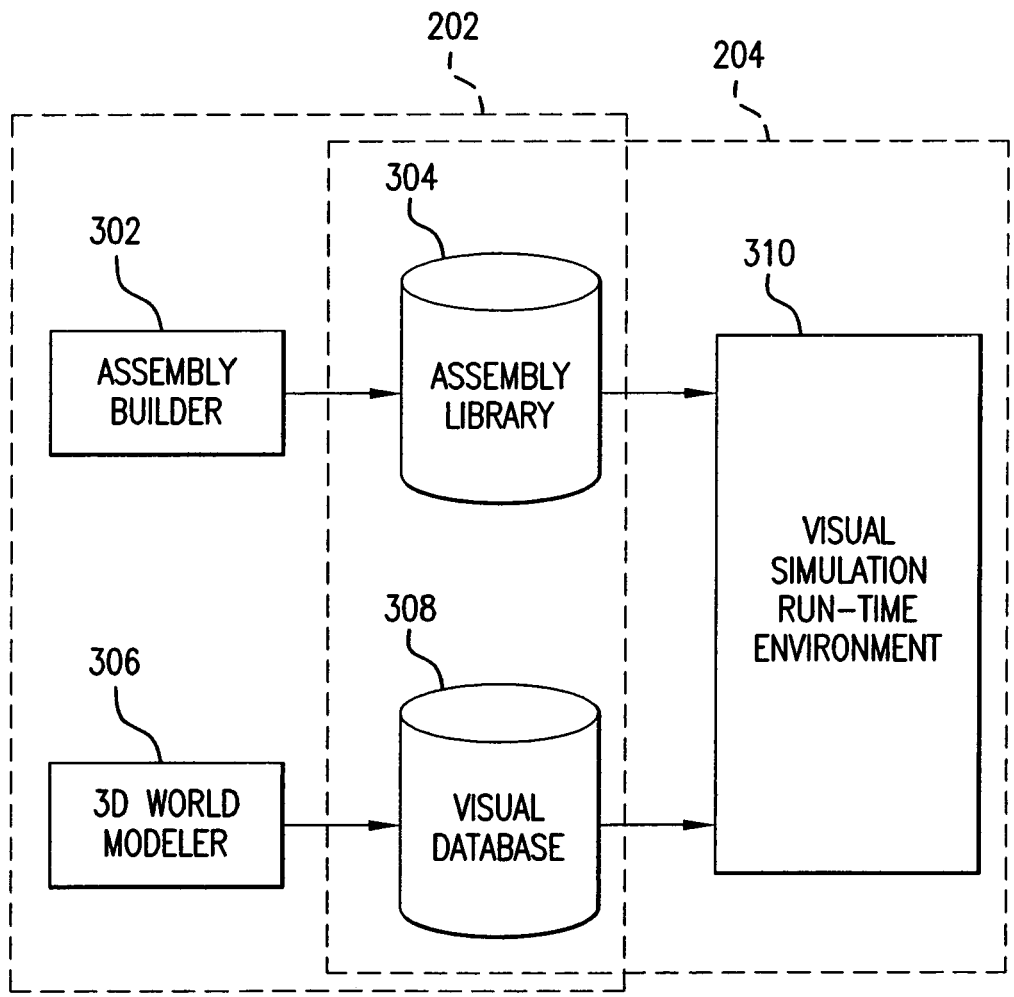
FIG. 3 is a block diagram depicting the modeling environment and the run-time environment of FIG. 2 in more detail.

FIG. 3 is a high-level block diagram that shows the modeling environment 202 and the run-time environment 204 of the 3D simulation environment 200 in more detail. As shown in FIG. 3, the modeling environment 202 comprises an assembly builder 302 and a 3D world modeler 306, and the run-time environment 204 comprises a visual simulation run-time environment 310. An assembly library 304 and a visual database 308 are common to both the modeling environment 202 and the run-time environment 204, as will be explained below, The 3D world modeler 306 represents a software tool for modeling the objects and animations that define the virtual world of the simulation. The models generated by the 3D world modeler 306 are stored in the visual database 308, where they are accessible to the visual simulation run-time 310. These models are built off-line, prior to execution of the visual simulation run-time 310. The 3D world modeler 306 may be implemented using any of a variety of known 3D world modeling utilities, as will be appreciated by persons skilled in the art.

The assembly builder 302 is a utility that permits a user to build one or more physics-based assemblies for user navigation, each of which can be selectively accessed during the execution of the 3D simulation in the run-time environment 204. Each physics-based assembly comprises an eye-point model for user navigation in the run-time environment 204 and may also comprise means for interacting with the 3D simulation. Assemblies constructed using the assembly builder 302 are stored in the assembly library 304, where they are accessible to the visual simulation run-time 310. Because the assembly builder 302 permits a user to construct a variety of customized navigation models, the assemblies constructed by the assembly builder 302 may be advantageously utilized with a wide variety of virtual environments.

Figure 4:
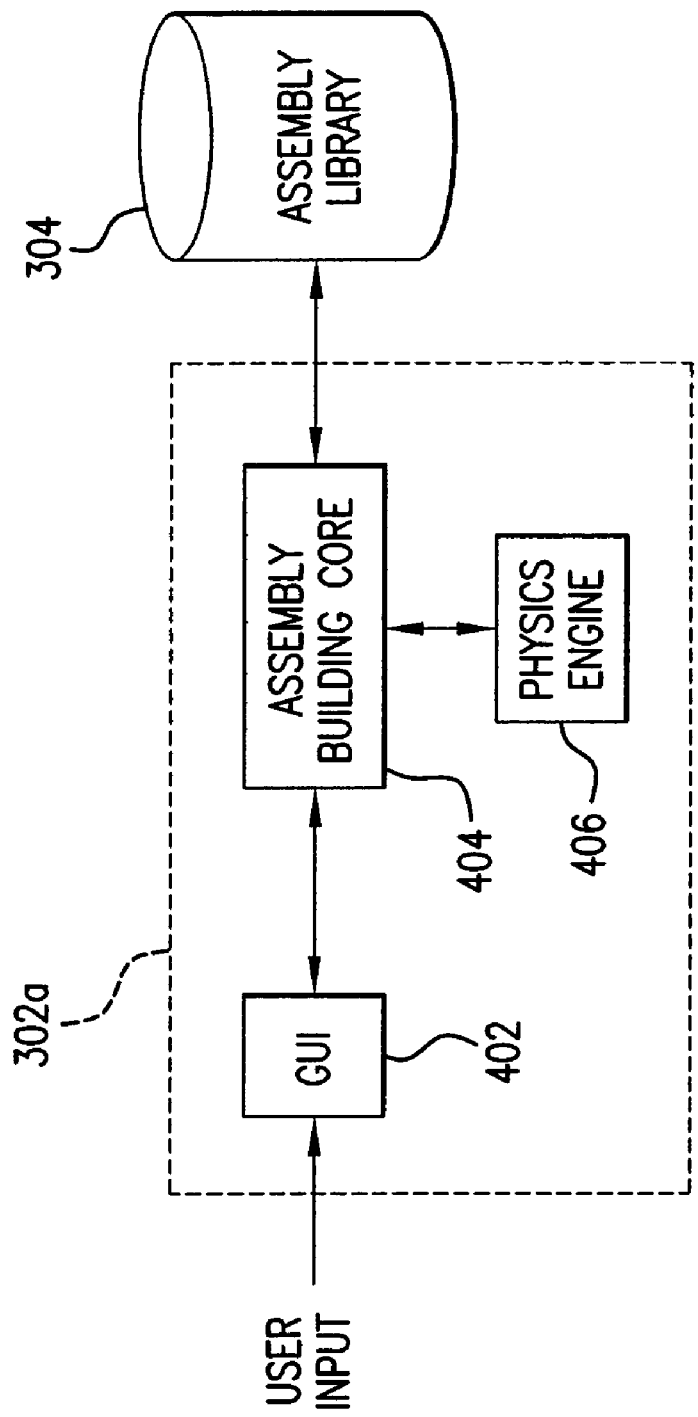
FIG. 4 is a block diagram of an example assembly building utility in accordance with embodiments of the present invention.

FIG. 4 is a block diagram of an example assembly builder 302*a* in accordance with embodiments of the present invention. As shown in FIG. 4, the example assembly builder 302*a* includes a graphical user interface (GUI) 402, an assembly building core 404, and a physics engine 406. The assembly builder 302*a* is coupled to the assembly library 304 for storing assemblies created during the assembly construction process.

In accordance with embodiments of the present invention, a user interacts with the GUI 402 to construct one or more behavioral assemblies from a predefined set of physical elements. Physical elements are graphical representations of simulated physical constraints and forces that may act upon a given behavioral assembly, and are preferably designed to be easily recognized and understood by a user. The predefined set of physical elements is presented to the user through the GUI 402, and the user is permitted to selectively combine the physical elements to construct a behavioral assembly. By combining physical elements, the user can build customized physics-based behavioral assemblies of varying levels of complexity.

Outside of the interface functions of the GUI 402, the bulk of the functionality of the assembly builder 302*a* is implemented in the assembly building core 404. The functions of the assembly building core 404 include presenting display data to the user via the GUI 402, interpreting user commands received via the GUI 402, constructing assemblies, and storing behavioral assemblies to the assembly library 304 when directed to do so by the user.

The assembly building core 404 is also coupled to a physics engine 406 so that behavioral assemblies constructed by the user may be simulated in a test mode. To this end, the assembly building core 404 converts the behavioral assembly into a model that is understandable by the physics engine 406. As will be appreciated by persons skilled in the relevant art(s), the physics engine 406 may comprise any one of a number of commercially-available physics engines designed for use with computer-simulated 3D virtual environments. In an embodiment, the physics engine 406 comprises a Vortex™ physics engine developed by Critical Mass Labs of Montreal (Quebec), Canada.

Figure 5:
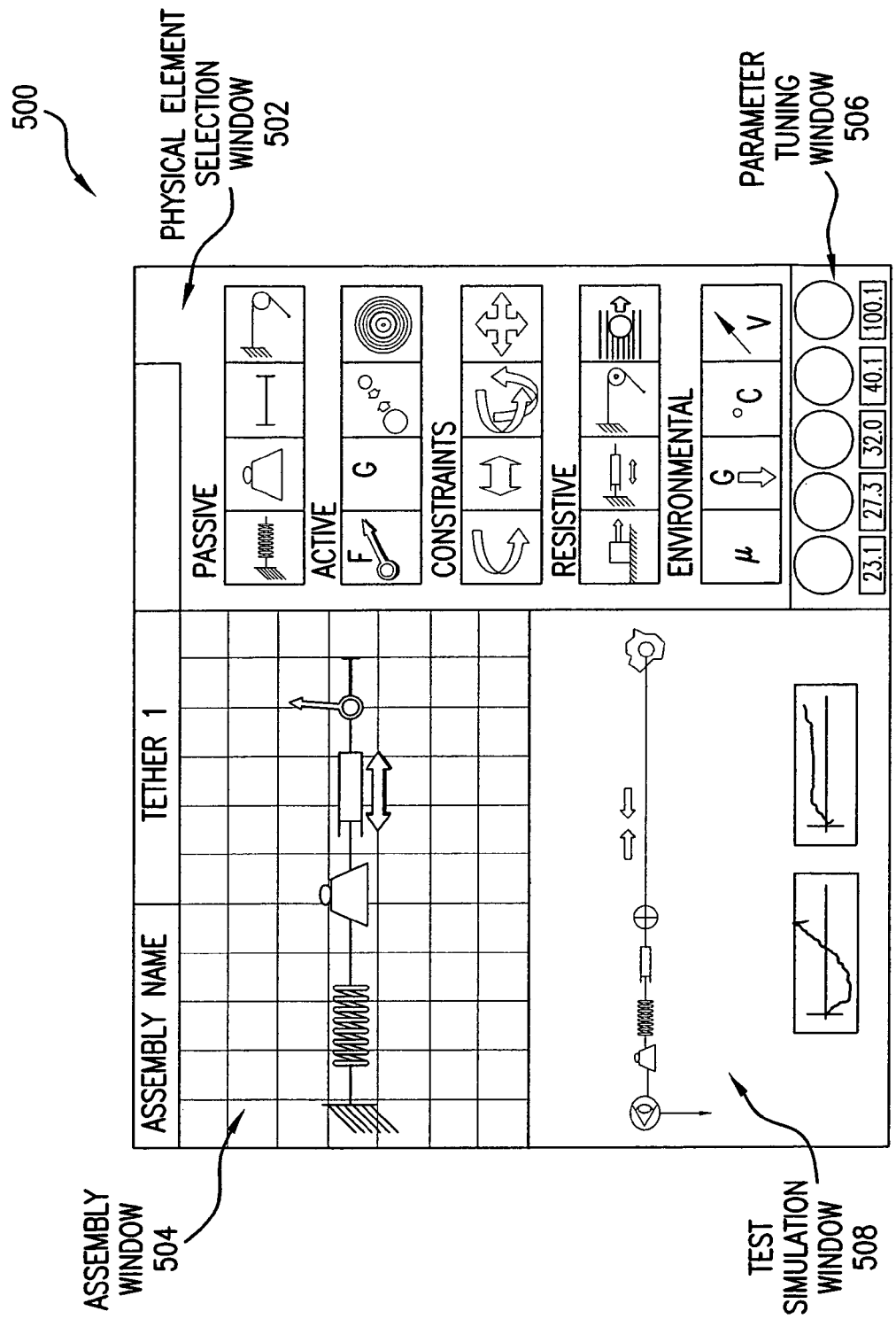
FIG. 5 depicts an example graphical user interface (GUI) window for constructing a behavioral assembly in accordance with embodiments of the present invention.

FIG. 5 depicts an interface window 500, which is an example embodiment of the GUI 402. The interface window 500 is presented herein by way of example, and is not intended to limit the present invention. As shown in FIG. 5, the example interface window 500 comprises four sub-windows: a physical element selection window 502; an assembly window 504; a parameter tuning window 506; and a test simulation window 508. The interface window 500 is displayed to the user during the assembly building process, and provides an interactive environment for facilitating the construction of one or more user-defined behavioral assemblies. The interface window 500 utilizes easily-recognizable and understandable graphical elements to achieve this goal.

The physical element window 502 presents the user with a predefined set of physical elements, each of which is represented as a simple graphic, or icon. As shown in FIG. 5, the physical elements may comprise a plurality of active elements, which define active forces, passive elements, which are elements that generate a force only when acted upon, constraints, which restrict one or more degrees of freedom, resistive elements, which act to resist motion, and environmental elements. Environmental elements are used to a define "local" environmental conditions in which the assembly will operate that may be different from the "global" conditions present in the 3D simulation. For example, an assembly may be constructed for traveling in a zero-gravity space simulation. However, a "local" gravitational field may be added to the assembly to ensure that the assembly always returns to a certain default position-in other words, an up and a down are created for the assembly. Alternately, a viscosity may be added to the local assembly environment to ensure that the assembly will not continually float through space when a force is applied to it. A set of detailed examples of physical elements are set forth in Section C, below.

The user may select a physical element from the physical element selection window 502 and place it in the assembly window 504. This may be accomplished, for example, using an input device such as a computer mouse to click and drag physical elements from the physical element selection window 502 to the assembly window 504. By combining physical elements in the assembly window 504, the user may construct behavioral assemblies of varying degrees of complexity. A set of detailed examples of behavioral assemblies are provided in Section C, below.

Once one or more physical elements have been placed in the assembly window 504, the user may then utilize the parameter tuning window 506 to adjust one or more parameter values relating to each of the physical elements in the assembly window 504. The parameter window 504 may comprise one or more dials, sliders and/or text boxes that can be accessed by the user for adjusting default parameter values. For example, if a physical element in the assembly window 504 comprises a mass, the user may utilize the parameter tuning window 506 to modify the weight associated with the mass. Similarly, if a physical element in the assembly window comprises a sliding friction element, the user may utilize the parameter tuning window 506 to modify one or more friction coefficients associated with the sliding friction element. Thus, the parameter tuning window 506 permits the user to fine-tune the parameters of the various physical elements that make up a behavioral assembly.

The test simulation window 508 permits the user to simulate the behavioral assembly in a real-time test environment. The test simulation window preferably displays the simulated assembly in 3D. As discussed in reference to FIG. 4, above, the example assembly modeler 302*a* utilizes a built-in physics engine 406 for performing the test simulation. After the test simulation has been executed, feedback concerning the performance of the assembly is presented to the user via the test simulation window 508. This feedback may comprise text and/or graphical information. Based on the feedback, the user may then utilize the parameter tuning window to fine-tune elements of the assembly, add additional physical elements to the assembly from the physical element selection window 502, or remove physical elements from the assembly window 504.

By simulating the behavioral assembly in test mode, problems with the design of the assembly may be identified and resolved off-line, prior to execution of the visual simulation run-time. This is considerably more efficient than setting up and executing the actual 3D simulation to identify problems with a behavioral assembly. This also provides the designer of the behavioral assembly with immediate feedback concerning the consequences of any particular design choice.

Figure 6:
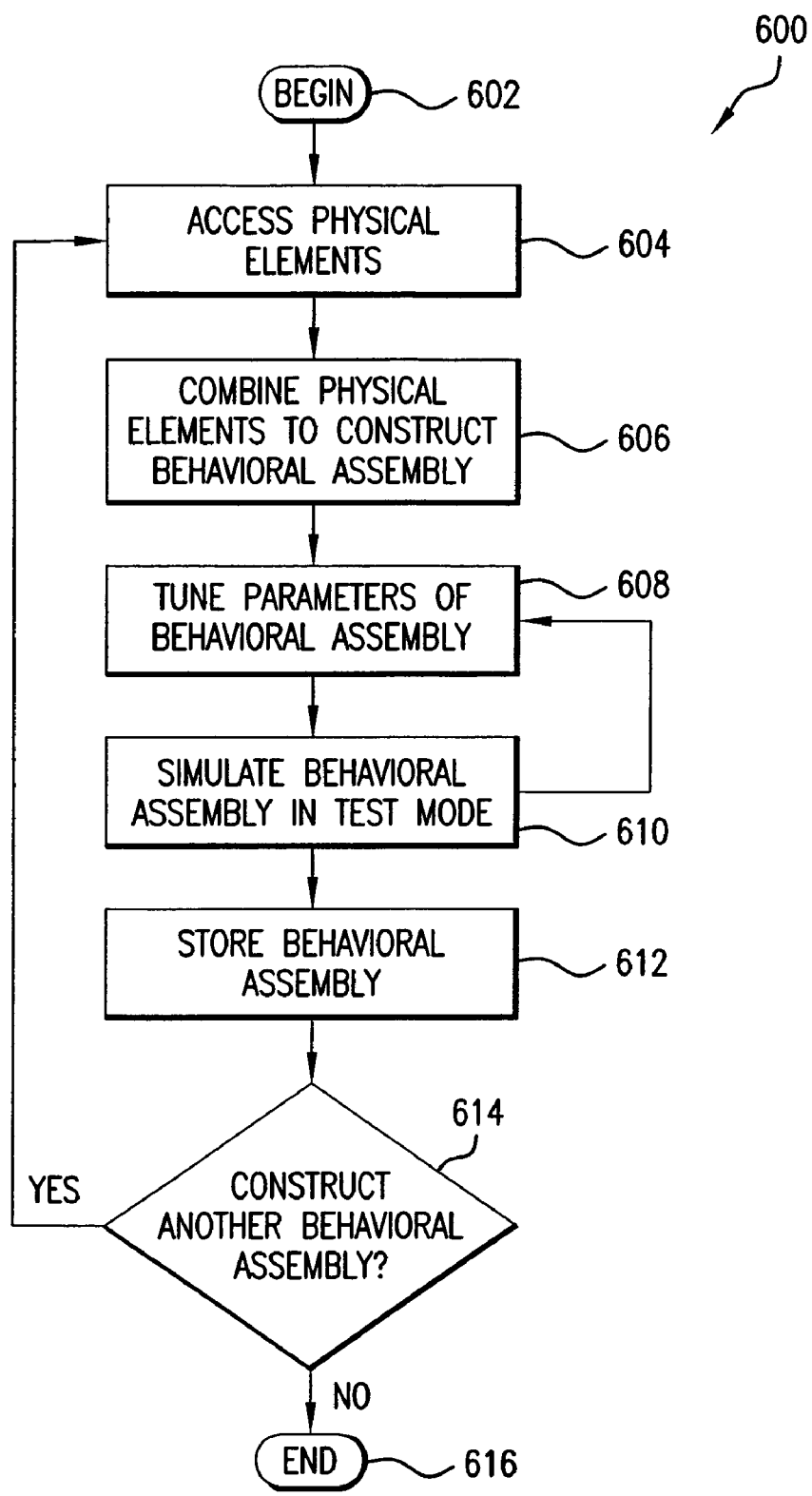
FIG. 6 depicts a flowchart of a method for constructing behavioral assemblies in accordance with embodiments of the present invention.

To further describe this process, FIG. 6 depicts a flowchart 600 of a method for constructing behavioral assemblies in accordance with embodiments of the present invention. The invention, however, is not limited to the description provided by the flowchart 600. Rather, it will be apparent to persons skilled in the art from the teachings provided herein that other functional flows are within the scope and spirit of the present invention. For convenience, the flowchart 600 will be described with continued reference to the example assembly builder interface window 500 of FIG. 5. For example, the method described in flowchart 600 may be performed by a user, in whole or in part, through interaction with the interface window 500 of FIG. 5. However, the invention is not limited to that embodiment.

The method begins at step 602, when, for example, the user first accesses the interface window 500. The user then accesses a predefined set of physical elements, as shown at step 604. For example, the user may access the predefined set of physical elements displayed in the physical element selection window 502 of the interface window 500. The user then combines selected physical elements to construct a behavioral assembly, as shown at step 606. For example, the user may click and drag selected physical elements from the physical element selection window 502 for combination with other selected physical elements in the assembly window 504. In accordance with an embodiment of the present invention, the user may also combine pre-existing behavioral assemblies to create a new behavioral assembly.

As shown at step 608, once a behavioral assembly has been constructed, one or more parameters associated with each of the physical elements that make up the assembly may optionally be modified by the user. These parameters will govern the behavior of the assembly and its various sub-components both during test simulation mode and at run-time. With continued reference to the interface window 500 of FIG. 5, these parameters may be adjusted by accessing one or more dials, sliders and/or text boxes in the parameter tuning window 506.

Once a behavioral assembly has been created and optionally fine-tuned, it may be simulated in a test mode, as shown at step 610. Thereafter, the results of the test simulation are presented to the user. For example, with reference to the interface window 500 of FIG. 5, the test simulation and corresponding feedback information is displayed in the test simulation window 508.

After simulating the behavioral assembly in test mode, the user may decide to fine-tune parameters of the assembly based on the results of the simulation. This is indicated by the backward arrow connecting step 610 to step 608 in flowchart 600. After re-adjusting the parameters of the assembly, the user may again simulate the assembly in test mode to evaluate the performance of the assembly in light of the adjustments. This process of fine-tuning and testing may be repeated as many times as necessary in order to achieve desired performance characteristics. Once the user is satisfied with the design of the behavioral assembly, it is stored in an assembly library as shown at step 612, where it is accessible to the visual simulation run-time.

Once the behavioral assembly design process is complete, the user is given the option of constructing another behavioral assembly, as shown at step 614. If the user decides to construct another behavioral assembly, then the user may begin the process again at step 604 by accessing the physical elements. Alternately, if the user decides not to construct another behavioral assembly, then the process ends at step 616.

Figure 7:
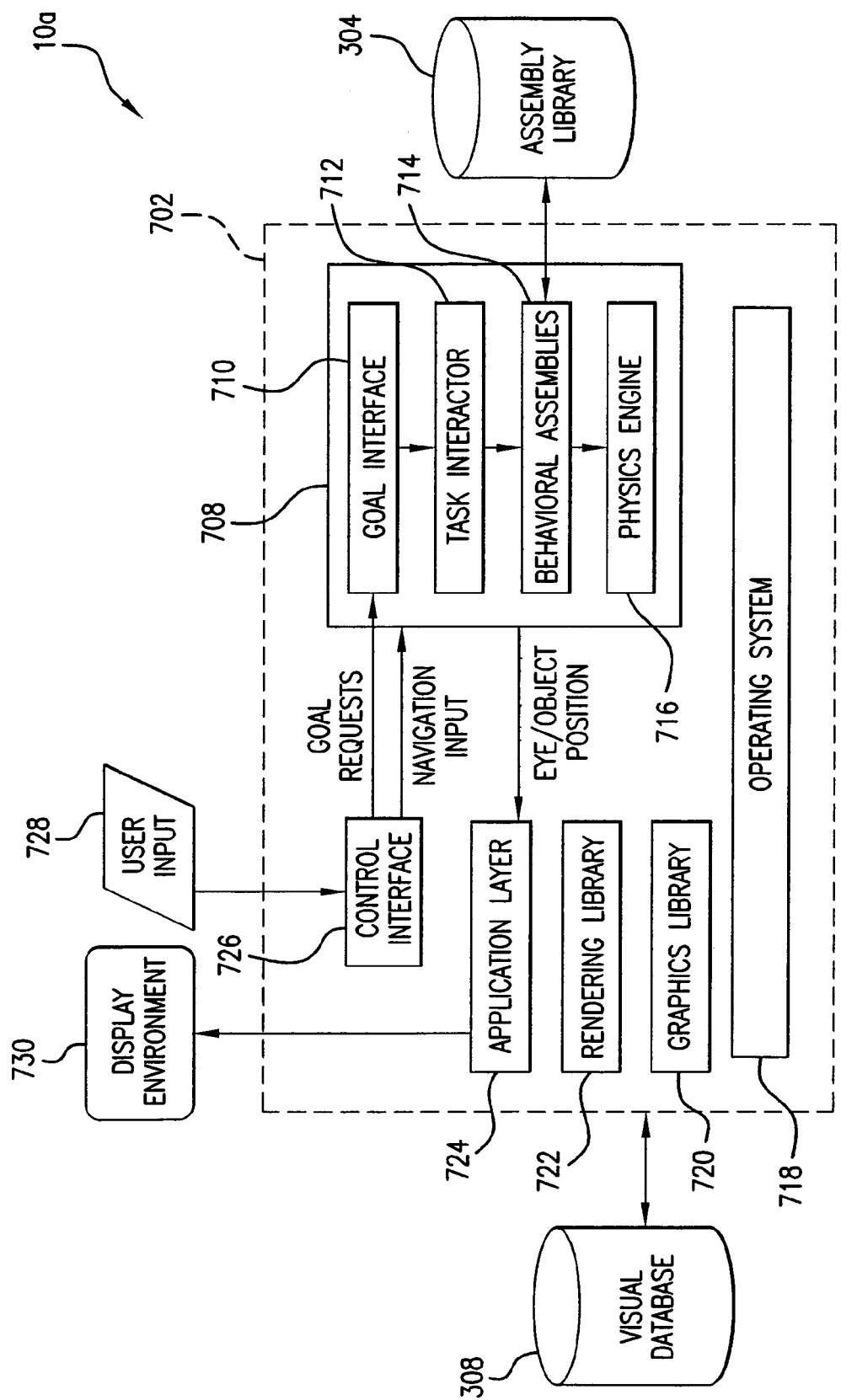
FIG. 7 illustrates a functional block diagram of a visual simulation run-time environment in accordance with embodiments of the present invention.

2. Visual Run-Time Environment in Accordance with Embodiments of the Present Invention FIG. 7 illustrates a functional block diagram of a visual simulation run-time environment 310a in accordance with embodiments of the present invention. The visual simulation run-time environment 310a is only one example of the visual simulation run-time environment 310 of FIG. 3. As shown in FIG. 7, the visual simulation run-time environment 310a includes a visual run-time application 702, a visual database 308 and an assembly library 304.

The visual database 308 stores the properties of all the objects and animations that make up the virtual world. As discussed above, the visual database 308 is built in the modeling environment prior to run-time. Upon execution, the visual run-time application 702 acquires object and animation information from the visual database 308 and uses this information to construct a real-time user-interactive display environment 730. As also discussed above, the assembly library 304 is likewise populated in the modeling environment prior to run-time. The assembly library 304 contains one or more physics-based assemblies each of which may be selectively accessed during the 3D simulation for user navigation, as will be discussed in more detail herein.

The visual run-time application 702 comprises multiple software layers. At the lowest level is the operating system 118 of the computer on which the application 702 is running. Above the operating system 718 is a graphics library 720 and a rendering library 722. The graphics library 720 and the rendering library 722 provide the ability to select, process and render a visual scene in real time. The graphics library 720 is used to perform core graphics functions for generating images in the display environment 730, while the rendering library 722 is used to implement higher level functions specifically tailored for rapidly generating efficient and functionally-rich simulations. In an embodiment, the rendering library 722 is implemented using IRIS Performer™ 3D rendering libraries developed by Silicon Graphics, Inc. of Mountain View, Calif.

Above the graphics library 720 and the rendering library 722 is an application layer 724 that performs the highest-level functions of the visual run-time application 702 including orchestrating calls to the rendering library 722 and/or graphics library 720, determining the current visual scenario at any particular time with reference to the visual database 308, such as determining the positions and state of objects and the environment, and presenting that scenario to the user via the display environment 730.

In accordance with embodiments of the present invention, user navigation, including interactive user control and eye-point modeling, is implemented through the use of a navigation run-time module 708 that operates in conjunction with the visual run-time application 702. The navigation run-time module 708 is run concurrently with, or as part of, the visual run-time application 702, on top of the operating system 718. As will be discussed below, the navigation run-time module 708 provides easy and intuitive navigation control by translating simple, high-level user commands into a series of complex motion controls, and provides natural, cinematic-style eye-point modeling through the use of physics-based assemblies and a real-time physics engine.

As shown in FIG. 7, the navigation run-time module 708 comprises a suite of sub-modules that interfaces with the application layer 724. These sub-modules include a goal interface 710, a task interactor 712, a set of behavioral assemblies 714, and an underlying physics engine 716. The goal interface 710 comprises the highest level sub-module of the navigation run-time module 708, and operates to receive goal requests from a user via the control interface 726. Goal requests comprise a predefined set of user commands for achieving a specified navigation goal in the real-time virtual environment. For ease of use, goal requests are preferably defined as simple, high level directives. After receiving a goal request, the goal interface 710 interprets it to generate one or more constituent tasks.

The task interactor 712 includes logic for receiving the one or more tasks generated by the goal interface 710 and for determining which of the behavioral assemblies 714 is most appropriate for performing each task. In certain instances, more than one behavioral assembly may be selected to perform a given task, with each behavioral assembly governing user navigation during a portion of the task. The behavioral assemblies 714 are accessible to the navigation run-time module 702 from the assembly library 304, and may either be loaded prior to execution of the visual run-time application 702 (for example, during the compiling of the visual run-time application 702) or dynamically loaded during execution.

Each behavioral assembly or combination of behavioral assemblies selected by the task interactor 712 provides a physics-based eye-point model for execution of the task. Each behavioral assembly selected by the task interactor 712 may also provide means for interacting with the 3D simulation during execution of the task, thus providing real-time control. For example, a selected behavioral assembly may permit the user to control the eye-point during execution of a task through the application of steering, acceleration or braking controls. The interaction of the behavioral assembly and the 3D simulation is modeled using a physics engine 716, which comprises the lowest layer of the navigation run-time tool 708. In an embodiment, the physics engine 716 comprises a Vortex™ physics engine developed by Critical Mass Labs of Montreal (Quebec), Canada.

The eye-point modeling process utilizes the real time physics engine 716 to determine the instantaneous behavior of the selected behavioral assembly. To perform this process, the navigation run-time tool 708 solicits visual database feedback from the visual database 308. This feedback information includes the position and velocities of objects and parts of the virtual environment, as well as information such as eye-point distance from a specified object or element (determined through a technique known as "ray casting"). Based on this information, the navigation run-time module 708 determines if a "collision" has occurred and responds appropriately based on the characteristics of the currently-selected behavioral assembly. The primary output of the modeling process is the position, gaze direction and velocity of the eye-point and other objects in the scene. This information is provided from the navigation run-time module 708 to the application layer 724 for constructing the display environment 730. This data is supplied on a periodic basis, such as, for example, on a per frame basis, to enable real time eye-point motion control.

Because the navigation run-time module 708 utilizes physics-based behavioral assemblies 714 and a real-time physics engine 716 to perform eye-point modeling, eye-point motion in the display environment 730 will tend to be smooth and natural, with movement and collisions being resolved in accordance with the laws of physics. This represents a substantial improvement over conventional navigation interfaces.

As discussed above, in accordance with embodiments of the present invention, behavioral assemblies may be designed to accept user control input such as steering, acceleration, and braking input, which will affect the eye-point model. This navigation input, as well as the goal requests discussed above, are received via a control interface 726. The control interface 726 includes a user input device for inputting goal requests and other navigation input.

Example user input devices include, but are not limited to, a computer keyboard and/or mouse, a joystick, a stylus/graphics tablet, a personal digital assistant, or a voice-activated interface device. In an embodiment, the user input device is a wired input device. In an alternate embodiment, the user input device is a wireless input device.

Figure 8:
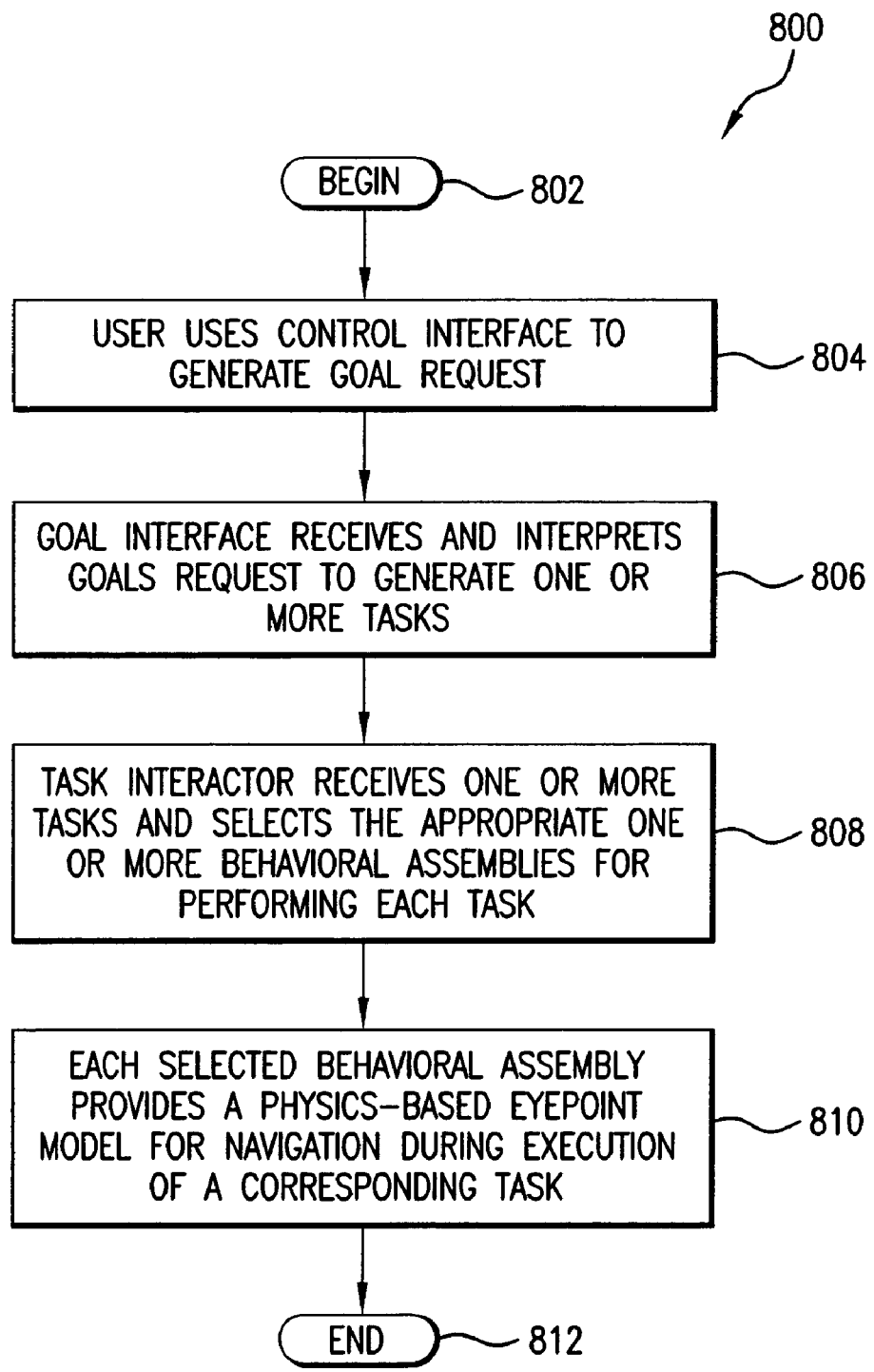
FIG. 8 depicts a flowchart of a method for interactive user navigation in a real-time 3D simulation in accordance with embodiments of the present invention.

FIG. 8 depicts a flowchart 800 of a method for interactive user navigation in a real-time 3D simulation in accordance with embodiments of the present invention. The invention, however, is not limited to the description provided by the flowchart 800. Rather, it will be apparent to persons skilled in the art from the teachings provided herein that other functional flows are within the scope and spirit of the present invention. For convenience, the flowchart 800 will be described with continued reference to the example visual simulation run-time environment 310a of FIG. 7. However, the invention is not limited to that embodiment.

The method begins at step 802. At step 804, a user provides input to a control interface to generate a goal request. For example, with reference to FIG. 7, the user provides user input 728 to the control interface 726 to generate a goal request. In an embodiment, a set of pre-defined goals are presented to the user in a menu format, and upon selection of a goal from the menu, the control interface 726 generates a corresponding goal request. In an alternate embodiment, the user identifies a goal and the control interface 726 translates the identified goal into a corresponding goal request.

At step 806, the goal interface receives the goal request and interprets the goal request to generate one or more corresponding tasks. For example, with reference to FIG. 7, the goal interface 710 receives the goal request and interprets the goal request to generate one or more corresponding tasks.

At step 808, a task interactor receives the one or more tasks generated by the goal interface and selects at least one appropriate behavioral assembly for performing each task. For example, with reference to FIG. 7, the task interactor 712 receives the one or more tasks generated by the goal interface 710 and selects at least one appropriate behavioral assembly 714 for performing each task.

As shown at step 810, each selected behavioral assembly then provides a physics-based eye-point model for navigation during execution of a corresponding task. For example, with reference to FIG. 7, each selected behavioral assembly 714 provides a physics-based eye-point model for navigation during execution of a corresponding task. At step 812, the method ends.

C. Example Physical Elements and Behavioral Assemblies in Accordance with Embodiments of the Present Invention FIGS. 9–15 depict a number of example physical elements and behavioral assemblies in accordance with embodiments of the present invention. These examples have been included to provide a better understanding of the present invention and are not intended to limit the invention. Based on the teachings provided herein, persons skilled in the art will appreciate that a wide variety of additional physical elements may be utilized to practice the present invention. Similarly, persons skilled in the art will appreciate that a wide variety of additional behavioral assemblies may be constructed and utilized in accordance with embodiments of the present invention.

1. Example Physical Elements

As discussed above, physical elements comprise graphical representations of simulated physical constraints and forces that may act upon a given behavioral assembly.

Physical elements may represent forces and constraints that occur in accordance with natural physical laws (in other words, in accordance with Newton's laws) as well as in accordance with "imaginary" laws that deviate from natural physical laws (for example, anti-gravity mechanisms, tractor fields, drag in zero gravity, and the like). A predefined set of physical elements are presented to the user via the assembly builder GUI. The user combines one or more physical elements to construct a behavioral assembly, which comprises a physics-based assembly for user navigation in the real-time simulation.

Each physical element comprises a shorthand for a particular physical constraint or force on the assembly being built. For example, physical elements may include, but are not limited to, passive elements, motion constraints, active elements, resistive elements, and environmental elements. Physical elements are preferably designed to be easily recognized and understood by a user so that they may be rapidly combined to achieve a desired effect.

FIGS. 9–12 illustrate examples of physical elements that may be used to build a behavioral assembly in accordance with embodiments of the present invention. The physical elements depicted in FIGS. 9–12 are presented by way of example, and are not intended to be limiting. Rather, as will be appreciated by persons skilled in the art, a wide variety of physical elements may be utilized to model behavioral assemblies in accordance with embodiments of the present invention.

FIGS. 9A–9D depict passive physical elements that may be incorporated into a behavioral assembly in accordance with embodiments of the present invention. These elements are passive in the sense that they must be acted upon in order to produce a physical effect. For example, FIG. 9A depicts a mass 902 that, when attached to a behavioral assembly, will generate a localized force in response to a simulated gravitational field. FIG. 9B depicts a linear spacer 904 that may be attached to a behavioral assembly to provide a given separation. FIG. 9C depicts a linear spring 906 that may be attached to a behavioral assembly to provide an extensible/compressible separation. FIG. 9D depicts a rotary spring 908 that may be attached to a behavioral assembly to provide an extensible/compressible separation around a selected axis of rotation.

FIGS. 10A–10D depict motion constraint physical elements that may be incorporated into a behavioral assembly in accordance with embodiments of the present invention. These elements tend to remove one or more degrees of freedom from the motion of the behavioral assembly. For example, FIG. 10A depicts a linear slider 1002 that, when attached to a component of a behavioral assembly, will remove five degrees of freedom, restricting motion to a single linear path. FIG. 10B depicts a ball joint 604 that will remove three degrees of freedom, such that the only motion that is permitted is rotation along the x-, y-, and z-axes is permitted. FIG. 10C depicts a hinge 1006 that removes five degrees of freedom such that rotation is permitted in only a single direction. FIG. 10D depicts a sliding surface 1008 that removes four degrees of freedom, such that motion is only allowed in the x and y directions.

FIGS. 11A–11E depict active physical elements that may be incorporated into a behavioral assembly in accordance with embodiments of the present invention. These elements are active in the sense that they comprise forces that act upon the behavorial assembly. For example, FIG. 11A depicts a gravitational field 1102 that, when applied to a behavioral entity, will generate a downward force with respect to a given reference plane. FIG. 11B depicts an arbitrary force 1104 that may be applied to the behavioral assembly in any direction. FIG. 11C depicts a mass attraction 1106 that may be used to generate an attractive force between one component of the behavioral assembly and another component or a given object. FIG. 11D depicts a torque 1108 that may be applied to the behavioral assembly to generate a twisting force. FIG. 11E depicts an attractor field 1110 which may be attached to a behavioral assembly to generate a zone of attractive force around a given point.

FIGS. 12A–12F depict resistive physical elements that may be incorporated into a behavioral assembly in accordance with embodiments of the present invention. Resistive elements are elements that act to resist motion. For example, FIG. 12A depicts a surface drag 1202 that may be attached to the behavioral assembly so that a resistive force is generated when the assembly comes into contact with a given surface. FIG. 12B depicts a fluid drag 1204 that will generate a resistive force when the assembly moves through a fluid. FIG. 12C depicts a lift 1206 that will generate an upward force on the assembly in response to forward motion through air. FIG. 12D depicts a control surface 1208 that may be attached to the behavioral assembly to generate a desired force when a fluid, such as air, flows across it. FIG. 12E depicts an air brake 1210 that may be attached to the behavioral assembly to generate a force resistive to forward motion when moving through air. FIG. 12F depicts a linear motion damper 1212 and a rotary motion damper 1214 that may be attached to a behavioral assembly to dampen an applied force by absorbing energy.

2. Example Behavioral Assemblies

As discussed above, the assembly builder permits a user to generate physics-based behavioral assemblies that are selectively utilized at run-time for user navigation within the simulation. For example, the assembly builder can be used to model a vehicle that is controlled by the user to navigate through a simulation. Alternatively, the scenario builder can be used to model an eye-point that is attached to a vehicle for navigation through the simulation.

Although behavioral assemblies are visible to the user during the assembly building process, they are preferably not visible during the simulation. In other words, they are transparent to the user during the simulation. However, in accordance with an embodiment of the invention, behavioral assemblies may be made visible during the simulation. For example, the behavioral assemblies may be made visible during the simulation for testing and/or demonstration purposes.

Set forth below are several additional examples of behavioral assemblies that may be constructed and utilized in accordance with embodiments of the present invention to address certain application-specific needs. However, these examples are not intended to be limiting, and the assembly builder may be used to generate a wide variety of navigation assemblies as will be appreciated by persons skilled in the art from the teachings provided herein.

In accordance with embodiments of the present invention, each of the example behavioral assemblies described below could be quickly constructed by a user using the assembly builder 302 of FIG. 3, and therefore would involve no programming at all by the user. Each assembly could then be invoked at run time by an operator through the use of a simple high-level command.

a. Navigation through Confined Spaces

Figure 13A:
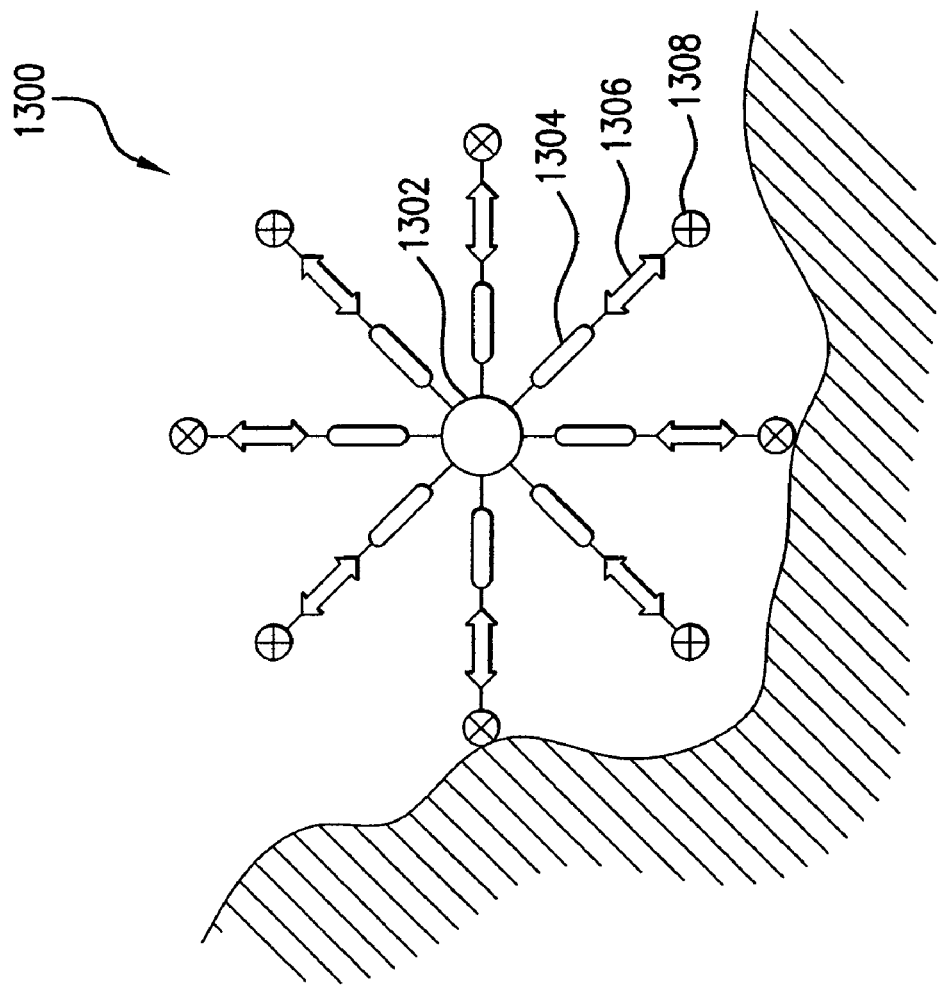

FIG. 13A depicts an example behavioral assembly 1300 that may be advantageously utilized for navigation through a closely confined space. Navigation through a closely confined space is a problem typically encountered in architectural walkthroughs and other 3D simulations of structural interiors, such as simulations of the interior of a space station or, even, of the human body. In conventional simulators, poor modeling causes the eye-point to repeatedly collide with walls and/or become stuck when navigating through confined spaces. This combination of disjointed motion and a confined space can result in an unpleasant experience for an audience, even provoking nausea. These effects also tend to destroy the "suspension of disbelief" that the simulation is designed to create.

The behavioral assembly 1300, which may be termed a "porcupine deflector," provides an eye-point motion model that can deflect through walls and move naturally through a simulated scene, thus resolving the aforementioned navigation problems. The assembly 1300 comprises a center mass 1302, weighted for a normal 1G environment, with an attached set of outwardly-radiating "spines." Each spine comprises a spring 1306, damper 1304 and low-friction roller 1308 combination. The spines radiate in three dimensions, including in and out of FIG. 13A; however, these latter spines are not shown for the sake of simplicity.

The eye-point is attached to the center mass 1302. The spines act as radial probes, permitting collisions to be detected before the eye-point itself meets with a surface. The spring 1306 and damper 1304 combinations permit for "cushioned" collisions in the virtual environment, allowing the assembly 1300 to gently glance off objects and walls. The low-friction rollers 1308 attached to the end of each spine operate to avoid any unwanted rotations during a scraping collision between the assembly 1300 and, for example, a wall or floor. Thrusters (not shown) are attached to the center mass 1302, and can be applied to induce forward locomotion. In an embodiment, viscosity may be applied to the assembly environment to allow for a graceful decay of speed when thrust is stopped. The eye-point motion achieved by the behavioral assembly 1300 is simple and natural, providing a cinematic quality to the motion that is natural and pleasing to the user/audience.

Figure 13B:
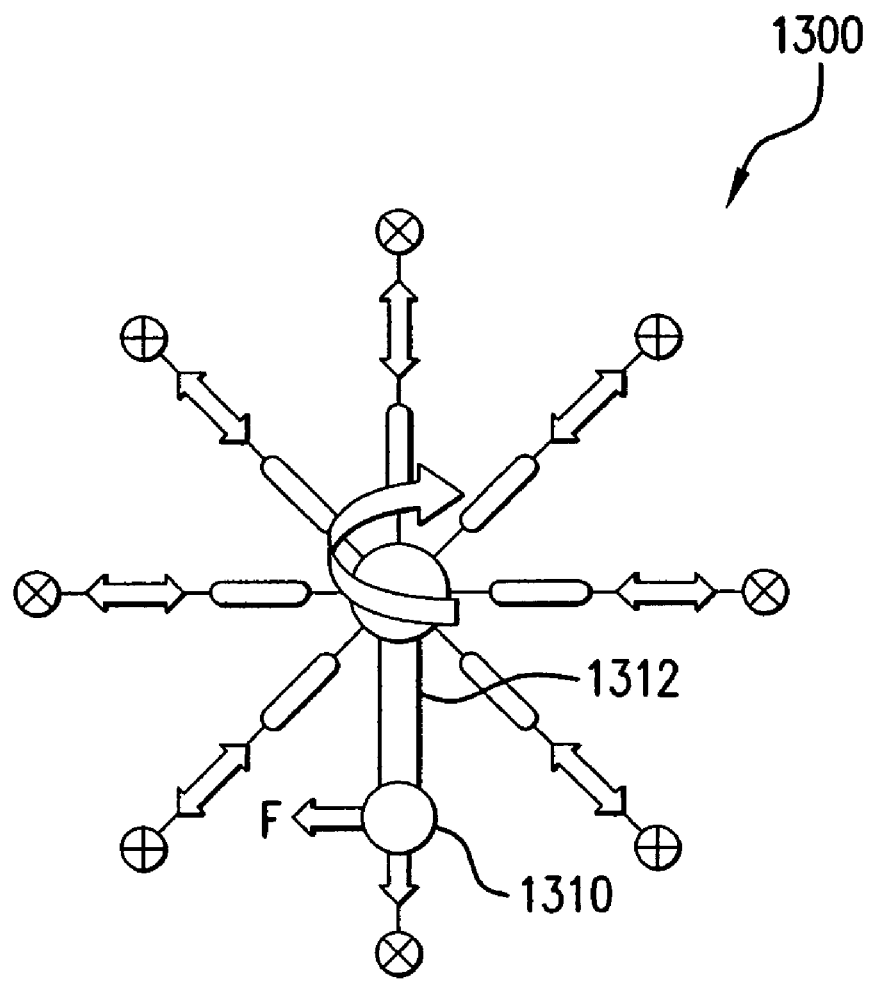

An additional navigation problem that may be addressed by the "porcupine deflector" behavioral assembly is that of banking through turns. When turning a corner, conventional motion control mechanisms usually produce a flat yaw rotation with no compensating roll component that produces an unnatural feel. As shown in FIG. 13B, this issue may be solved by adding a counterweight 1310 to the behavioral assembly 1300 with a solid connector 1312. The counterweight 1310 provides a constant downward force that produces a natural-feeling roll as the assembly is negotiated through a turn. The counterweight 1310 additionally acts as a self-righting mechanism, ensuring that the behavioral assembly, and thus the eye-point, always returns to an upright position. A torsional damper would eliminate any unwanted rotational oscillation on completion of the turn.

b. Observing Points of Interest

Figure 14A:
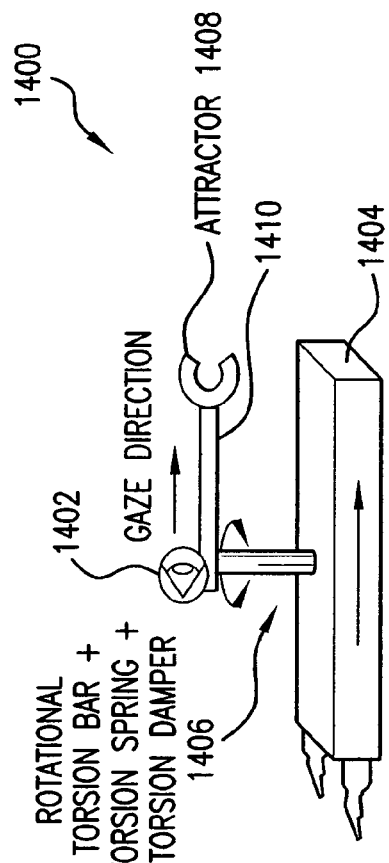

FIG. 14A depicts an example behavioral assembly 1400 that may be advantageously utilized for observing points of interest in a simulation. In a simulation, it is often desirable to alert a user when they travel within the proximity of certain points of interest, such as selected objects and animations, and to cause the user to observe those points of interest for a period of time. Conventional systems do not handle this process effectively. As a result, the user may either miss the point of interest entirely because they are never alerted, or, alternately, the user may have difficulty maneuvering into a suitable position to view the point of interest, particularly where the eye-point is already in motion.

The use of the example behavioral assembly 1400 to resolve the above-identified issues presupposes that a target node has been inserted at the location of a point of interest within the visual database. The target node is inserted as part of the visual database modeling process. In accordance with this example, multiple target nodes may be inserted at various locations within the visual database to identify multiple points of interest. Each of the target nodes is then assigned a "magnetic attraction strength" which would typically relate to the significance of the point of interest. Each target node may also be assigned a fall off function that determines how the magnitude of the attraction varies with distance. The fall-off function may define a minimum and maximum cut-off range, such that there would be no attraction beyond or within a certain range.

As shown in FIG. 14A, the behavioral assembly 1400, which may be termed a "gaze control assembly," comprises an eye-point 1402 attached to a moving object 1404. For the purposes of the present example, the moving object 1404 is a simulated space vehicle. The direction of the eye-point 1402 normally defaults to the forward direction of the vehicle 1404. The eye-point 1402 is attached to the vehicle 1404 via a torsion spring module 1406, which comprises a rotational torsion bar coupled to a torsion spring and torsion damper. A magnetic attractor 1408 is coupled to the top of the torsion spring module 1406 by a rigid arm 1410.

Figure 14B:
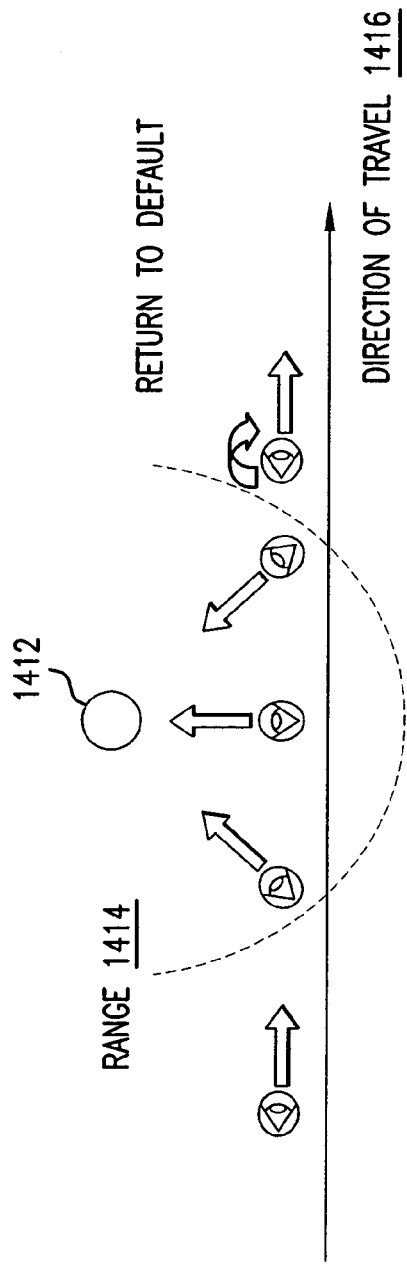

FIG. 14B depicts the behavior of the behavioral assembly 1400 as it passes a point of interest 1412, which is marked with a target node in the visual database as discussed above. For the purposes of this example, the point of interest 1412 comprises a planet that the space vehicle 1404 passes while moving in a given direction of travel 1416. As the assembly 1400 comes within a predefined proximity range 1414 of the point of interest 1412, the attractor 1408 swivels on the torsion spring module 1406 in response to the attractive force between the attractor 1408 and the target node, drawing the eye-point 1402 with it. The force of the attraction is governed by the magnetic attraction strength and fall-off function of the target node as well as the distance between the assembly 1400 and the point of interest 1412.

By drawing the eye-point towards the point of interest, the magnetic attraction automatically ensures that the user observes the point of interest 1412 while moving past it. The presence of the torsion spring and torsion damper in the torsion spring module 1406 further ensures that the swiveling of the eye-point 1402 will be smooth and controlled. Gaze direction will be held to the point of interest until the range 1414 is exceeded, at which the point the eye-point will spring back to the default position. Where the vehicle 1404 is within range of two target nodes, the attractor 1408 will be drawn to the target node with the higher magnetic attraction strength, thus permitting the world builder to rank the importance of various competing points of interest.

c. Attaching to an Object/Orbit Insertion

The process of attaching to an object, or orbit insertion, is a complex navigational maneuver that typically requires a significant amount of mathematical computation prior to the execution of the simulation. However, this maneuver is a valuable if not essential transition that needs to be performed in many planetarium or space navigation virtual environments. Furthermore, the ability to attach to a high velocity object such as a comet or a passing spacecraft is vital if one is to effectively observe a moving object for any period of time. In each instance, the frame of reference of the user must be seamlessly adjusted to that of the object in question. Additionally, the user must be able to smoothly break out of the attachment and pursue other goals when desired.

FIG. 15A depicts an example behavioral assembly 1500 that may be advantageously utilized for performing attachment to an object, or orbit insertion, within a simulation. The behavioral assembly 1500 may be termed a "sticky tether" and operates, in essence, by casting a line to attach to a target and by "reeling" the target in. In particular, the assembly 1500 comprises a variable length tether 1502, which is essentially a wire on a reel, coupled with a spring 1504 and a damper 1506 to smooth out accelerations. The tether 1502 preferably possesses a very high tensile stiffness, and thus has negligible stretch. The assembly 1500 further comprises the eye-point 1508 and a mass 1506, which provides the assembly 1500 with a selected weight and serves to bias the eye-point 1508 with reference to a given gravitational plane.

The user of the behavioral assembly 1500 provides a command to cast the end of the tether to the target object, to which it attaches. The tether is then reeled in at a variable rate to maintain the desired closure; e.g., constant speed or perhaps constant acceleration. The effect may vary depending upon the mass of the assembly 1506 and the mass of the target object. For example, if the mass of the assembly 1506 is light and the mass of the target object is heavy (e.g., the assembly 1500 is part of a light spacecraft and the target object is a planet), the assembly 1500 will be drawn to the target object, and the target object will not move appreciably. However, if the target object is lighter than the assembly 1500, then the target object will be drawn to the assembly 1500. It is further possible that target objects may be "locked" in place, such that it is possible for the assembly 1500 to be drawn to a target object without moving it.

Once the behavioral assembly 1500 approaches the target object, which may comprise a planet or moon, it is likely and desirable that the eye-point 1508 should be placed into an orbit so as to observe the target object and keep station. To achieve this, a lateral rocket thrust 1510 is applied on approach that starts a rotational component effectively putting the assembly 1500 into orbit, as the remainder of the tether 1502 is reeled in down to the desired orbital height. The user may then release the tether 1502 and shut off rocket power 1510 to allow the assembly 1500 to find its own natural orbit height and orbit velocity, $V_r$, as shown in FIG. 15B. If the orbital speed and height is known for a specific vehicle and planet, these can be entered as target values for automatic release of the tether and rocket shutdown. This will produce a very smooth vehicle transition that will exit from the maneuver into a natural orbit governed by the correct laws of physics for that environment.

It may also be desired to achieve an orbit that does not comply with the laws of physics. For example, it may be desired to make a low slow pass over a large planet that would normally bring the behavioral assembly 1500 into an undesirable touchdown situation. To accomplish this, the tether 1502 may be retained and in fact made incompressible. Consequently, the gravitational force of the target object is resisted and any speed and height can be selected and maintained by changing the length of the tether 1502 and through control of the lateral rocket thrust 1510. At any time, selecting target speed and height for natural orbit and releasing the tether 1502 can achieve a return to natural orbit.

D. Alternate Modeling and Run-Time Environments in Accordance with Embodiments of the Present Invention In the above-described embodiments, a modeling environment is used to construct behavioral assemblies which are then selectively accessed at run-time for navigation in a user-interactive real-time 3D simulation. However, the present invention also contemplates the construction of behavioral assemblies in the run-time environment. Thus, in an embodiment, the functionality of the assembly builder 302 described above is integrated into the visual run-time application 702 to permit a user to build behavioral assemblies in the run-time environment. These behavioral assemblies may then be stored in the assembly library 304 and accessed by the navigation run-time module 708 in the manner already described above in reference to FIGS. 7 and 8.

Figure 16:
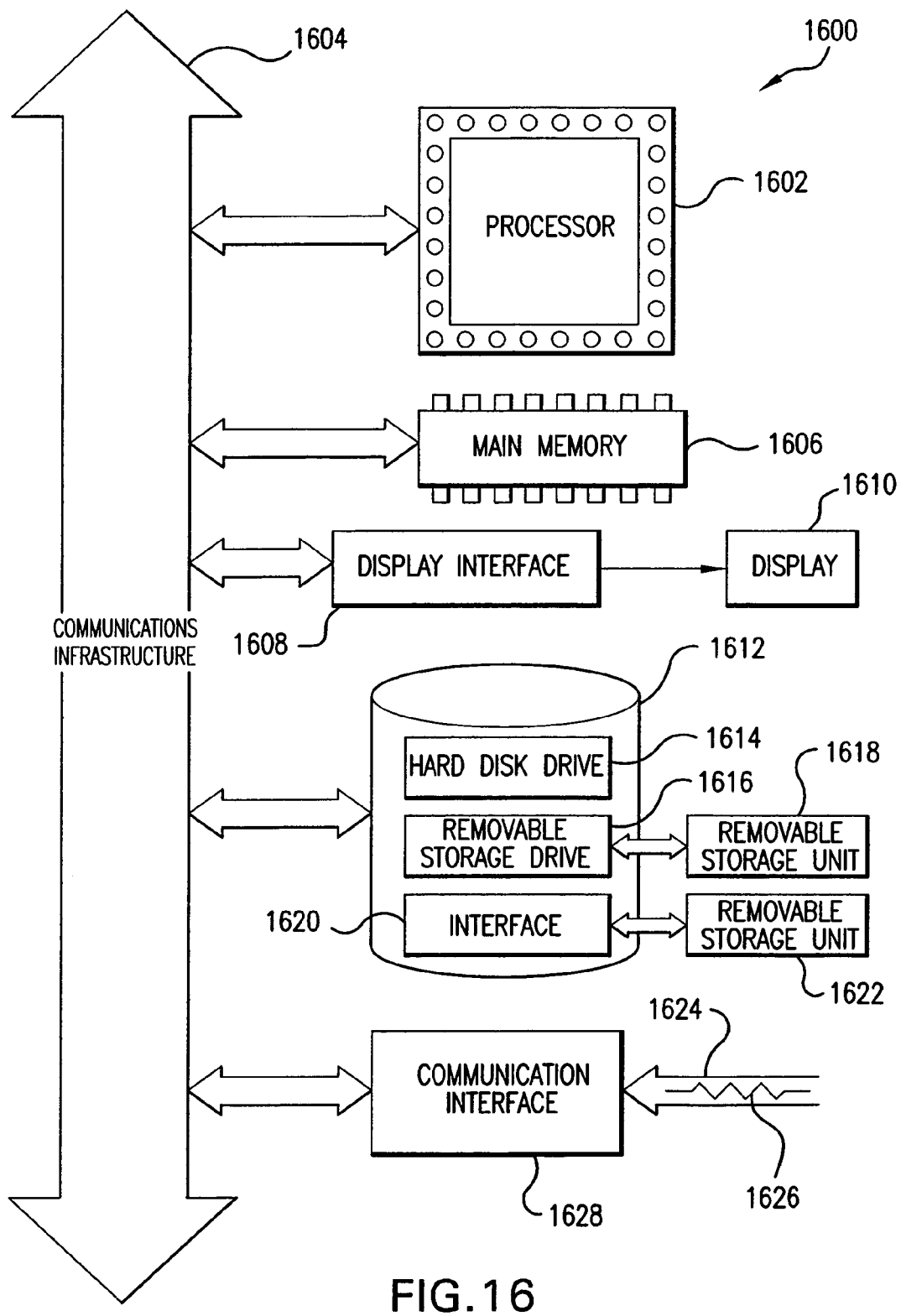
FIG. 16 illustrates an example computer system for implementing a modeling environment and/or visual simulation run-time environment in accordance with embodiments of the present invention.

E. Example Computer System Implementation in Accordance with Embodiments of the Present Invention The above-described modeling and run-time environments of the present invention can be implemented using hardware, software, or a combination thereof and may be implemented in one or more computer systems or other processing systems. FIG. 16 depicts an example computer system 1600 that may be utilized to implement embodiments of the present invention. For example, the computer system 1600 may be utilized to implement the assembly building and visual run-time applications of the present invention.

As shown in FIG. 16, the example computer system 1600 includes a processor 1602 for executing software routines in accordance with embodiments of the present invention. Although a single processor 1602 is shown for the sake of clarity, the computer system 1600 may also comprise a multi-processor system. The processor 1602 is connected to a communication infrastructure 1604 for communication with other components of the computer system 1600. The communication infrastructure 1604 may comprise, for example, a communications bus, cross-bar, or network.

Computer system 1600 further includes a main memory 1606, such as a random access memory (RAM), and a secondary memory 1612. The secondary memory 1612 may include, for example, a hard disk drive 1614 and/or a removable storage drive 1616, which may comprise a floppy disk drive, a magnetic tape drive, an optical disk drive, or the like. The removable storage drive 1616 reads from and/or writes to a removable storage unit 1618 in a well known manner. Removable storage unit 1618 may comprise a floppy disk, magnetic tape, optical disk, or the like, which is read by and written to by removable storage drive 1616. As will be appreciated by persons skilled in the art, the removable storage unit 1618 includes a computer usable storage medium having stored therein computer software and/or data.

In alternative embodiments, secondary memory 1612 may include other similar means for allowing computer programs or other instructions to be loaded into computer system 1600. Such means can include, for example, a removable storage unit 1622 and an interface 1620. Examples of a removable storage unit 1622 and interface 1620 include a program cartridge and cartridge interface (such as that found in video game console devices), a removable memory chip (such as an EPROM, or PROM) and associated socket, and other removable storage units 1622 and interfaces 1620 which allow software and data to be transferred from the removable storage unit 1622 to computer system 1600.

Computer system 1600 further includes a display interface 1608 that forwards graphics, text, and other data from the communication infrastructure 1604 or from a frame buffer (not shown) for display to a user on a display unit 1610.

Computer system 1600 also includes a communication interface 1628. Communication interface 1628 allows software and data to be transferred between computer system 1600 and external devices via a communication path 1624. Examples of communications interface 1628 can include a modem, a network interface (such as Ethernet card), a communications port, and the like. Software and data transferred via communications interface 1628 are in the form of signals 1626 which can be electronic, electromagnetic, optical or other signals capable of being received by communications interface 1628. These signals are provided to the communications interface via the communication path 1624.

As used herein, the term "computer program product" may refer, in part, to removable storage unit 1618, removable storage unit 1622, a hard disk installed in hard disk drive 1614, or a carrier wave carrying software over a communication path 1624 (wireless link or cable) to communication interface 1628. A computer useable medium can include magnetic media, optical media, or other recordable media, or media that transmits a carrier wave or other signal. These computer program products are means for providing software to computer system 1600.

Computer programs (also called computer control logic) are stored in main memory 1606 and/or secondary memory 1612. Computer programs can also be received via communications interface 1628. Such computer programs, when executed, enable the computer system 1600 to perform the features of the present invention as discussed herein. In particular, the computer programs, when executed, enable the processor 1602 to perform features of the present invention. Accordingly, such computer programs represent controllers of the computer system 1600.

The present invention can be implemented as control logic in software, firmware, hardware or any combination thereof. In an embodiment where the invention is implemented using software, the software may be stored in a computer program product and loaded into computer system 1600 using removable storage drive 1616, hard disk drive 1614, or interface 1620. Alternatively, the computer program product may be downloaded to computer system 1600 over communications path 1624. The software, when executed by the processor 1602, causes the processor 1602 to perform functions of the invention as described herein.

F. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for providing interactive user navigation in a real-time three dimensional simulation, comprising the steps of:
    combining physical elements from a predefined set of physical elements to construct a plurality of behavioral assemblies;
    storing said plurality of behavioral assemblies in a library;
    executing the real-time three dimensional simulation;
    selecting one of said plurality of behavioral assemblies from said library during execution of the simulation, wherein said selected one of said plurality of behavioral assemblies provides a physics-based eye-point model for user navigation in the simulation.

2. The method of claim 1, wherein said combining step comprises:
    presenting said predefined set of physical elements in a first window of a graphical user interface; and
    selectively combining physical elements from said first window in a second window of said graphical user interface to construct said plurality of behavioral assemblies.

3. The method of claim 2, wherein said combining step further comprises:
    adjusting a parameter of at least one of said selectively combined physical elements in a third window of said graphical user interface.

4. The method of claim 3, wherein said combining step further comprises:
    simulating the performance of said plurality of behavioral assemblies in a fourth window of said graphical user interface.

5. The method of claim 1, wherein said predefined set of physical elements includes at least one of a passive element, a constraint, an active element, or a resistive element.

6. The method of claim 1, wherein said selecting step comprises:
    identifying a goal request;
    translating said goal request into a plurality of tasks; and
    selecting one of said plurality of behavioral assemblies from said library to perform one of said plurality of tasks, wherein said selected one of said plurality of behavioral assemblies provides a physics-based eye-point model for user navigation during performance of said one of said plurality of tasks.

7. The method of claim 1, further comprising the steps of:
    detecting a collision between said selected one of said plurality of behavioral assemblies and an object in the real-time three dimensional simulation; and
    invoking a real-time physics engine to model the interaction between said selected one of said plurality of behavioral assemblies and said object.

8. A method for interactive user navigation in a real-time three dimensional simulation, comprising the steps of:
    combining physical elements from a predefined set of physical elements to construct a plurality of behavioral assemblies;
    storing said plurality of behavioral assemblies in a library;
    executing the real-time three dimensional simulation; and
    during execution of the real-time three dimensional simulation:
        generating a goal request,
        translating said goal request into a plurality of tasks, and
        selecting one of said plurality of behavioral assemblies from said library to perform one of said plurality of tasks, wherein said selected one of said plurality of behavioral assemblies provides a physics-based eye-point model for user navigation during performance of said one of said plurality of tasks.

9. A system for providing interactive user navigation in a real-time three dimensional simulation, comprising:
    an assembly builder, wherein said assembly builder includes a first interface that permits a user to combine physical elements from a predefined set of physical elements to construct a plurality of behavioral assemblies;
    a library that stores said plurality of behavioral assemblies; and
    a visual run-time application that executes the real-time three dimensional simulation, wherein said visual run-time application includes a second interface that receives a goal request from said user, and a navigation run-time module, said navigation run-time module configured to receive said goal request from said second interface and to select during said execution one of said plurality of behavioral assemblies from said library based on said goal request, wherein said selected one of said plurality of behavioral assemblies provides a physics-based eve-point model for interactive navigation in the simulation.

10. The system of claim 9, wherein said first interface comprises a first window that presents said predefined set of physical elements to said user and a second window that permits said user to selectively combine physical elements from said first window to construct said plurality of behavioral assemblies.

11. The system of claim 10, wherein said first interface further comprises a third window that permits said user to adjust a parameter of at least one of said selectively combined physical elements.

12. The system of claim 11, wherein said first interface further comprises a fourth window that permits said user to simulate the performance of said plurality of behavioral assemblies.

13. The system of claim 9, wherein said predefined set of physical elements includes at least one of a passive element, a constraint, an active element, or a resistive element.

14. The system of claim 9, wherein said navigation run-time module comprises:
   a goal interface, wherein said goal interface is configured to receive said goal request from said second interface and to translate said goal request into a plurality of tasks; and
   a task interactor, wherein said task interactor is configured to receive said plurality of tasks from said goal interface and to select one of said plurality of behavioral assemblies from said library to perform one of said plurality of tasks, wherein said selected one of said plurality of behavioral assemblies provides a physics-based eye-point model for user navigation during execution of said one of said plurality of tasks.

15. The system of claim 9, wherein said navigation run-time module comprises:
   a real-time physics engine;
   wherein said navigation run-time module is configured to detect a collision between said selected one of said plurality of behavioral assemblies and an object in the real-time three dimensional simulation and to invoke said real-time physics engine to model the interaction between said selected one of said plurality of behavioral assemblies and said object.

16. A system for providing interactive user navigation in a real-time three dimensional simulation, comprising:
   an assembly builder, wherein said assembly builder includes a first interface that permits a user to combine physical elements from a predefined set of physical elements to construct a plurality of behavioral assemblies;
   a library that stores said plurality of behavioral assemblies; and
   a visual run-time application that executes the real-time three dimensional simulation, wherein said visual run-time application includes a second interface that receives a goal request from said user, and a navigation run-time module, said navigation run-time module comprising:
   a goal interface, wherein said goal interface is configured to receive said goal request from said second interface and to translate said goal request into a plurality of tasks, and
   a task interactor, wherein said task interactor is configured to receive said plurality of tasks from said goal interface and to select one of said plurality of behavioral assemblies from said library to perform one of said plurality of tasks, wherein said selected one of said plurality of behavioral assemblies provides a physics-based eye-point model for user navigation during execution of said one of said plurality of tasks.

17. A computer program product comprising a computer useable medium having computer program logic recorded thereon for enabling a processor in a computer system to provide interactive user navigation in a real-time three dimensional simulation, said computer program logic comprising:
   first means for enabling the processor to combine physical elements from a predefined set of physical elements to construct a plurality of behavioral assemblies;
   second means for enabling the processor to store said plurality of behavioral assemblies in a library;
   third means for enabling the processor to execute the real-time three dimensional simulation; and
   fourth means for enabling the processor to select one of said plurality of behavioral assemblies from said library during execution of the simulation, wherein said selected one of said plurality of behavioral assemblies provides a physics-based eye-point model for user navigation in the simulation.

18. The computer program product of claim 17, wherein said first means includes:
   means for enabling the processor to present said predefined set of physical elements in a first interface window; and
   means for enabling the processor to present a second interface window, said second interface window permitting a user to selectively combine physical elements from said first interface window to construct said plurality of behavioral assemblies.

19. The computer program product of claim 18, wherein said first means further includes:
   means for enabling the processor to present a third interface window, said third interface window permitting said user to adjust a parameter of at least one of said selectively combined physical elements.

20. The computer program product of claim 19, wherein said first means further includes:
   means for enabling the processor to present a fourth interface window, said fourth interface window permitting said user to simulate the performance of said plurality of behavioral assemblies.

21. The computer program product of claim 17, wherein said predefined set of physical elements comprises at least one of a passive element, a constraint, an active element, or a resistive element.

22. The computer program product of claim 17, wherein said fourth means comprises:
   means for enabling the processor to receive a goal request;
   means for enabling the processor to translate said goal request into a plurality of tasks; and
   means for enabling the processor to select one of said plurality of behavioral assemblies from said library to perform one of said plurality of tasks, wherein said selected one of said plurality of behavioral assemblies provides a physics-based eye-point model for user navigation during execution of said one of said plurality of tasks.

23. The computer program product of claim 17, further comprising:
   means for enabling the processor to detect a collision between said selected one of said plurality of behavioral assemblies and an object in the real-time three dimensional simulation; and
   means for enabling the processor to invoke a real-time physics engine to model the interaction between said selected one of said plurality of behavioral assemblies and said object.

24. A computer program product comprising a computer useable medium having computer program logic recorded thereon for enabling a processor in a computer system to provide interactive user navigation in a real-time three dimensional simulation, said computer program logic comprising:

first means for enabling the processor to combine physical elements from a predefined set of physical elements to construct a plurality of behavioral assemblies;

second means for enabling the processor to store said plurality of behavioral assemblies in a library;

third means for enabling the processor to execute the real-time three dimensional simulation; and fourth means for enabling the processor to, during execution of the real-time three dimensional simulation, receive a goal request, translate said goal request into a plurality of tasks, and select one of said plurality of behavioral assemblies from said library to perform one of said plurality of tasks, wherein said selected one of said plurality of behavioral assemblies provides a physics-based eye-point model for user navigation during performance of said one of said plurality of tasks.

* * * * *